(12) United States Patent
Zuo et al.

(10) Patent No.: US 11,599,369 B1
(45) Date of Patent: Mar. 7, 2023

(54) GRAPHICAL USER INTERFACE CONFIGURATION SYSTEM

(71) Applicant: Palantir Technologies Inc., Palo Alto, CA (US)

(72) Inventors: Hao Zuo, New York, NY (US); Arthur Wu, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 42 days.

(21) Appl. No.: 16/115,323

(22) Filed: Aug. 28, 2018

Related U.S. Application Data

(60) Provisional application No. 62/640,464, filed on Mar. 8, 2018.

(51) Int. Cl.
| | |
|---|---|
| *G06F 9/451* | (2018.01) |
| *G06F 3/0484* | (2022.01) |
| *G06F 40/14* | (2020.01) |
| *G06F 40/197* | (2020.01) |
| *H04L 67/306* | (2022.01) |

(52) U.S. Cl.
CPC ............ *G06F 9/451* (2018.02); *G06F 3/0484* (2013.01); *G06F 40/14* (2020.01); *G06F 40/197* (2020.01); *H04L 67/306* (2013.01)

(58) Field of Classification Search
CPC ........ G06F 9/451; G06F 40/14; G06F 3/0484; G06F 40/197; H04L 67/306
USPC ........................................ 715/229, 234, 239
See application file for complete search history.

(56) References Cited

U.S. PATENT DOCUMENTS

| | | |
|---|---|---|
| 4,881,179 A | 11/1989 | Vincent |
| 5,109,399 A | 4/1992 | Thompson |
| 5,241,625 A | 8/1993 | Epard et al. |
| 5,329,108 A | 7/1994 | Lamoure |
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 5,974,572 A | 10/1999 | Weinberg et al. |

(Continued)

FOREIGN PATENT DOCUMENTS

| | | |
|---|---|---|
| AU | 2013251186 | 11/2015 |
| CN | 102054015 | 5/2014 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Andrew R Dyer

(74) *Attorney, Agent, or Firm* — Knobbe, Martens, Olson & Bear LLP

(57) ABSTRACT

Systems and methods are provided for improved graphical user interface configuration. The system allows an administrator to rapidly and deploy create customized pages based on configuration files. Versioning and branching of the configuration files allows rapid development of the customized pages. The configurations for dynamic content cause such content to be retrieved and presented on pages. Short configuration sections cause large sections of a markup page to be generated without manual page programming.

14 Claims, 10 Drawing Sheets

(56) References Cited

U.S. PATENT DOCUMENTS

| | | | |
|---|---|---|---|
| 5,999,911 A | 12/1999 | Berg et al. | |
| 6,025,844 A | 2/2000 | Parsons | |
| 6,057,757 A | 5/2000 | Arrowsmith et al. | |
| 6,065,026 A | 5/2000 | Cornelia et al. | |
| 6,091,956 A | 7/2000 | Hollenberg | |
| 6,101,479 A | 8/2000 | Shaw | |
| 6,125,372 A * | 9/2000 | White | G06F 8/65 |
| 6,161,098 A | 12/2000 | Wallman | |
| 6,219,053 B1 | 4/2001 | Tachibana et al. | |
| 6,232,971 B1 | 5/2001 | Haynes | |
| 6,237,138 B1 | 5/2001 | Hameluck et al. | |
| 6,243,706 B1 | 6/2001 | Moreau et al. | |
| 6,247,019 B1 | 6/2001 | Davies | |
| 6,279,018 B1 | 8/2001 | Kudrolli et al. | |
| 6,341,310 B1 | 1/2002 | Leshem et al. | |
| 6,366,933 B1 | 4/2002 | Ball et al. | |
| 6,369,835 B1 | 4/2002 | Lin | |
| 6,370,538 B1 | 4/2002 | Lamping et al. | |
| 6,430,305 B1 | 8/2002 | Decker | |
| 6,456,997 B1 | 9/2002 | Shukla | |
| 6,470,269 B1 * | 10/2002 | Adar | G06F 16/958 709/219 |
| 6,523,019 B1 | 2/2003 | Borthwick | |
| 6,549,944 B1 | 4/2003 | Weinberg et al. | |
| 6,560,620 B1 | 5/2003 | Ching | |
| 6,581,068 B1 | 6/2003 | Bensoussan et al. | |
| 6,594,672 B1 | 7/2003 | Lampson et al. | |
| 6,631,496 B1 | 10/2003 | Li et al. | |
| 6,642,945 B1 | 11/2003 | Sharpe | |
| 6,665,683 B1 | 12/2003 | Meltzer | |
| 6,674,434 B1 | 1/2004 | Chojnacki et al. | |
| 6,714,936 B1 | 3/2004 | Nevin, III | |
| 6,775,675 B1 | 8/2004 | Nwabueze et al. | |
| 6,820,135 B1 | 11/2004 | Dingman | |
| 6,828,920 B2 | 12/2004 | Owen et al. | |
| 6,839,745 B1 | 1/2005 | Dingari et al. | |
| 6,850,317 B2 | 2/2005 | Mullins et al. | |
| 6,877,137 B1 | 4/2005 | Rivette et al. | |
| 6,944,777 B1 | 9/2005 | Belani et al. | |
| 6,944,821 B1 | 9/2005 | Bates et al. | |
| 6,967,589 B1 | 11/2005 | Peters | |
| 6,976,210 B1 | 12/2005 | Silva et al. | |
| 6,978,419 B1 | 12/2005 | Kantrowitz | |
| 6,980,984 B1 | 12/2005 | Huffman et al. | |
| 6,985,950 B1 | 1/2006 | Hanson et al. | |
| 7,036,085 B2 | 4/2006 | Barros | |
| 7,043,702 B2 | 5/2006 | Chi et al. | |
| 7,055,110 B2 | 5/2006 | Kupka et al. | |
| 7,062,511 B1 * | 6/2006 | Poulsen | G06F 16/954 |
| 7,065,714 B1 | 6/2006 | Theel et al. | |
| 7,086,028 B1 | 8/2006 | Davis et al. | |
| 7,139,800 B2 | 11/2006 | Bellotti et al. | |
| 7,158,878 B2 | 1/2007 | Rasmussen et al. | |
| 7,162,475 B2 | 1/2007 | Ackerman | |
| 7,168,039 B2 | 1/2007 | Bertram | |
| 7,171,427 B2 | 1/2007 | Witowski et al. | |
| 7,174,377 B2 | 2/2007 | Bernard et al. | |
| 7,178,106 B2 * | 2/2007 | Lamkin | H04N 5/765 715/716 |
| 7,188,317 B1 | 3/2007 | Hazel | |
| 7,194,680 B1 | 3/2007 | Roy et al. | |
| 7,213,030 B1 | 5/2007 | Jenkins | |
| 7,269,786 B1 | 9/2007 | Malloy et al. | |
| 7,278,103 B1 | 10/2007 | Clark et al. | |
| 7,278,105 B1 | 10/2007 | Kitts | |
| 7,290,698 B2 | 11/2007 | Poslinski et al. | |
| 7,308,442 B2 * | 12/2007 | Takahashi | G06F 16/313 |
| 7,333,998 B2 | 2/2008 | Heckerman et al. | |
| 7,370,047 B2 | 5/2008 | Gorman | |
| 7,379,811 B2 | 5/2008 | Rasmussen et al. | |
| 7,379,903 B2 | 5/2008 | Caballero et al. | |
| 7,392,254 B1 | 6/2008 | Jenkins | |
| 7,426,654 B2 | 9/2008 | Adams et al. | |
| 7,441,182 B2 | 10/2008 | Beilinson et al. | |
| 7,441,219 B2 | 10/2008 | Perry et al. | |
| 7,454,466 B2 | 11/2008 | Bellotti et al. | |
| 7,467,375 B2 | 12/2008 | Tondreau et al. | |
| 7,487,139 B2 | 2/2009 | Fraleigh et al. | |
| 7,502,786 B2 | 3/2009 | Liu et al. | |
| 7,525,422 B2 | 4/2009 | Bishop et al. | |
| 7,529,727 B2 | 5/2009 | Arning et al. | |
| 7,529,734 B2 | 5/2009 | Dirisala | |
| 7,558,677 B2 | 7/2009 | Jones | |
| 7,574,409 B2 | 8/2009 | Patinkin | |
| 7,574,428 B2 | 8/2009 | Leiserowitz et al. | |
| 7,579,965 B2 | 8/2009 | Bucholz | |
| 7,596,285 B2 | 9/2009 | Brown et al. | |
| 7,614,006 B2 | 11/2009 | Molander | |
| 7,617,232 B2 | 11/2009 | Gabbert et al. | |
| 7,620,628 B2 | 11/2009 | Kapur et al. | |
| 7,627,812 B2 | 12/2009 | Chamberlain et al. | |
| 7,634,717 B2 | 12/2009 | Chamberlain et al. | |
| 7,703,021 B1 | 4/2010 | Flam | |
| 7,706,817 B2 | 4/2010 | Bamrah et al. | |
| 7,712,049 B2 | 5/2010 | Williams et al. | |
| 7,716,077 B1 | 5/2010 | Mikurak | |
| 7,716,140 B1 | 5/2010 | Nielsen et al. | |
| 7,725,530 B2 | 5/2010 | Sah et al. | |
| 7,725,547 B2 | 5/2010 | Albertson et al. | |
| 7,730,082 B2 | 6/2010 | Sah et al. | |
| 7,730,109 B2 | 6/2010 | Rohrs et al. | |
| 7,765,489 B1 | 7/2010 | Shah | |
| 7,770,100 B2 | 8/2010 | Chamberlain et al. | |
| 7,805,457 B1 | 9/2010 | Viola et al. | |
| 7,809,703 B2 | 10/2010 | Balabhadrapatruni et al. | |
| 7,818,658 B2 | 10/2010 | Chen | |
| 7,827,494 B1 * | 11/2010 | Hedayatpour | G06F 8/38 715/742 |
| 7,870,493 B2 | 1/2011 | Pall et al. | |
| 7,877,421 B2 | 1/2011 | Berger et al. | |
| 7,880,921 B2 | 2/2011 | Dattilo et al. | |
| 7,894,984 B2 | 2/2011 | Rasmussen et al. | |
| 7,899,611 B2 | 3/2011 | Downs et al. | |
| 7,913,164 B1 * | 3/2011 | Svendsen | H04N 1/00132 715/249 |
| 7,917,376 B2 | 3/2011 | Bellin et al. | |
| 7,920,963 B2 | 4/2011 | Jouline et al. | |
| 7,933,862 B2 | 4/2011 | Chamberlain et al. | |
| 7,941,336 B1 | 5/2011 | Robin-Jan | |
| 7,958,147 B1 | 6/2011 | Turner et al. | |
| 7,962,281 B2 | 6/2011 | Rasmussen et al. | |
| 7,962,495 B2 | 6/2011 | Jain et al. | |
| 7,962,848 B2 | 6/2011 | Bertram | |
| 7,966,199 B1 | 6/2011 | Frasher | |
| 7,970,240 B1 | 6/2011 | Chao et al. | |
| 7,971,150 B2 | 6/2011 | Raskutti et al. | |
| 7,984,374 B2 | 7/2011 | Caro et al. | |
| 8,001,465 B2 | 8/2011 | Kudrolli et al. | |
| 8,001,477 B2 * | 8/2011 | Nauerz | G06F 9/543 715/742 |
| 8,001,482 B2 | 8/2011 | Bhattiprolu et al. | |
| 8,010,507 B2 | 8/2011 | Poston et al. | |
| 8,010,545 B2 | 8/2011 | Stefik et al. | |
| 8,015,487 B2 | 9/2011 | Roy et al. | |
| 8,024,778 B2 | 9/2011 | Cash et al. | |
| 8,036,632 B1 | 10/2011 | Cona et al. | |
| 8,073,857 B2 | 12/2011 | Sreekanth | |
| 8,103,543 B1 | 1/2012 | Zwicky | |
| 8,134,457 B2 | 3/2012 | Velipasalar et al. | |
| 8,145,703 B2 | 3/2012 | Frishert et al. | |
| 8,185,819 B2 | 5/2012 | Sah et al. | |
| 8,191,005 B2 | 5/2012 | Baier et al. | |
| 8,214,361 B2 | 7/2012 | Sandler et al. | |
| 8,214,764 B2 | 7/2012 | Gemmell et al. | |
| 8,225,201 B2 | 7/2012 | Michael | |
| 8,229,947 B2 | 7/2012 | Fujinaga | |
| 8,230,333 B2 | 7/2012 | Decherd et al. | |
| 8,234,632 B1 * | 7/2012 | Hugeback | G06F 11/3495 717/130 |
| 8,271,461 B2 | 9/2012 | Pike et al. | |
| 8,280,880 B1 | 10/2012 | Aymeloglu et al. | |
| 8,290,838 B1 | 10/2012 | Thakur et al. | |
| 8,290,926 B2 | 10/2012 | Ozzie et al. | |
| 8,290,942 B2 | 10/2012 | Jones et al. | |

(56) References Cited

U.S. PATENT DOCUMENTS

| | | |
|---|---|---|
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,392,556 B2 | 3/2013 | Goulet et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,495,048 B2* | 7/2013 | Lauridsen ............ G06F 16/958 |
| | | 707/706 |
| 8,498,984 B1 | 7/2013 | Hwang et al. |
| 8,504,911 B1* | 8/2013 | Thakare ................ H04L 67/02 |
| | | 715/234 |
| 8,510,743 B2 | 8/2013 | Hackborn et al. |
| 8,514,082 B2 | 8/2013 | Cova et al. |
| 8,515,207 B2 | 8/2013 | Chau |
| 8,527,949 B1 | 9/2013 | Pleis et al. |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,682,696 B1 | 3/2014 | Shanmugam |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,313 B2 | 8/2014 | Satlow |
| 8,799,799 B1 | 8/2014 | Cervelli et al. |
| 8,807,948 B2 | 8/2014 | Luo et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,880,997 B2* | 11/2014 | Jardine-Skinner ...... G06F 16/93 |
| | | 715/234 |
| 8,892,687 B1* | 11/2014 | Call ........................ H04L 67/42 |
| | | 709/217 |
| 8,917,274 B2 | 12/2014 | Ma et al. |
| 8,924,872 B1 | 12/2014 | Bogomolov et al. |
| 8,930,874 B2 | 1/2015 | Duff et al. |
| 8,937,619 B2 | 1/2015 | Sharma et al. |
| 8,938,686 B1 | 1/2015 | Erenrich et al. |
| 8,984,390 B2 | 3/2015 | Aymeloglu et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,116,975 B2 | 8/2015 | Shankar et al. |
| 9,165,100 B2 | 10/2015 | Begur et al. |
| 9,286,373 B2 | 3/2016 | Elliot et al. |
| 9,348,880 B1 | 5/2016 | Kramer et al. |
| 9,454,281 B2 | 9/2016 | Ward et al. |
| 9,483,387 B1* | 11/2016 | Allocca ............ G06F 11/3684 |
| 9,552,123 B1* | 1/2017 | Johnston ................ G06F 9/451 |
| 9,621,428 B1* | 4/2017 | Lev ........................ H04L 41/12 |
| 9,753,744 B1* | 9/2017 | Wells ..................... G06F 9/451 |
| 9,880,696 B2 | 1/2018 | Ward et al. |
| 10,263,971 B2* | 4/2019 | Zhang ..................... H04L 63/10 |
| 10,412,093 B2* | 9/2019 | Zhang ................... H04L 63/102 |
| 2001/0021936 A1 | 9/2001 | Bertram |
| 2002/0007409 A1* | 1/2002 | Rode ..................... H04L 63/166 |
| | | 709/227 |
| 2002/0032677 A1 | 3/2002 | Morgenthaler et al. |
| 2002/0033848 A1 | 3/2002 | Sciammarella et al. |
| 2002/0063734 A1* | 5/2002 | Khalfay ..................... G06F 8/30 |
| | | 715/744 |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2002/0194119 A1 | 12/2002 | Wright et al. |
| 2002/0194267 A1* | 12/2002 | Flesner ................ G06F 16/958 |
| | | 709/203 |
| 2002/0196229 A1 | 12/2002 | Chen et al. |
| 2002/0196273 A1* | 12/2002 | Krause .................. G06F 16/957 |
| | | 715/738 |
| 2003/0028560 A1 | 2/2003 | Kudrolli et al. |
| 2003/0036927 A1 | 2/2003 | Bowen |
| 2003/0039948 A1 | 2/2003 | Donahue |
| 2003/0055652 A1* | 3/2003 | Nichols ............... G06Q 20/0855 |
| | | 704/275 |
| 2003/0061132 A1 | 3/2003 | Mason et al. |
| 2003/0093507 A1* | 5/2003 | Shapiro ................... H04L 29/06 |
| | | 709/222 |
| 2003/0093755 A1 | 5/2003 | O'Carroll |
| 2003/0110448 A1* | 6/2003 | Haut ....................... G06F 21/604 |
| | | 715/241 |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0044648 A1 | 3/2004 | Anfindsen et al. |
| 2004/0046789 A1* | 3/2004 | Inanoria .................... G06F 8/38 |
| | | 715/748 |
| 2004/0064256 A1 | 4/2004 | Barinek et al. |
| 2004/0078451 A1 | 4/2004 | Dietz et al. |
| 2004/0083463 A1* | 4/2004 | Hawley .................. G06F 9/451 |
| | | 717/140 |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0205492 A1 | 10/2004 | Newsome |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0243555 A1 | 12/2004 | Bolsius et al. |
| 2004/0260702 A1 | 12/2004 | Cragun et al. |
| 2004/0267746 A1 | 12/2004 | Marcjan et al. |
| 2005/0004911 A1 | 1/2005 | Goldberg et al. |
| 2005/0010472 A1 | 1/2005 | Quatse et al. |
| 2005/0027705 A1 | 2/2005 | Sadri et al. |
| 2005/0027887 A1* | 2/2005 | Zimler ................ H04L 12/2814 |
| | | 709/249 |

(56) References Cited

U.S. PATENT DOCUMENTS

| | | |
|---|---|---|
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0091186 A1 | 4/2005 | Elish |
| 2005/0125715 A1 | 6/2005 | Di Franco et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059139 A1 | 3/2006 | Robinson |
| 2006/0059423 A1 | 3/2006 | Lehmann et al. |
| 2006/0074866 A1 | 4/2006 | Chamberlain et al. |
| 2006/0074881 A1 | 4/2006 | Vembu et al. |
| 2006/0080139 A1 | 4/2006 | Mainzer |
| 2006/0080619 A1 | 4/2006 | Carlson et al. |
| 2006/0093222 A1 | 5/2006 | Saffer et al. |
| 2006/0106847 A1 | 5/2006 | Eckardt et al. |
| 2006/0129746 A1 | 6/2006 | Porter |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0149596 A1 | 7/2006 | Surpin et al. |
| 2006/0155654 A1 | 7/2006 | Plessis et al. |
| 2006/0178915 A1 | 8/2006 | Chao |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0265417 A1 | 11/2006 | Amato et al. |
| 2006/0271277 A1 | 11/2006 | Hu et al. |
| 2006/0277460 A1 | 12/2006 | Forstall et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0016363 A1 | 1/2007 | Huang et al. |
| 2007/0018986 A1 | 1/2007 | Hauser |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0057966 A1 | 3/2007 | Ohno et al. |
| 2007/0061752 A1 | 3/2007 | Cory |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0113164 A1 | 5/2007 | Hansen et al. |
| 2007/0136095 A1 | 6/2007 | Weinstein |
| 2007/0150369 A1 | 6/2007 | Zivin |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0245339 A1 | 10/2007 | Bauman et al. |
| 2007/0266040 A1* | 11/2007 | Figlin ............... G06F 16/284 |
| 2007/0266336 A1 | 11/2007 | Nojima et al. |
| 2007/0284433 A1 | 12/2007 | Domenica et al. |
| 2007/0294643 A1 | 12/2007 | Kyle |
| 2007/0299697 A1 | 12/2007 | Friedlander et al. |
| 2008/0016155 A1 | 1/2008 | Khalatian |
| 2008/0016216 A1 | 1/2008 | Worley et al. |
| 2008/0034420 A1* | 2/2008 | Chang ............... G06F 16/972 726/15 |
| 2008/0034441 A1* | 2/2008 | Saha ................ G06F 16/958 726/27 |
| 2008/0040442 A1* | 2/2008 | Fieldman ........... G06Q 10/10 709/207 |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0091693 A1 | 4/2008 | Murthy |
| 2008/0104019 A1 | 5/2008 | Nath |
| 2008/0109714 A1 | 5/2008 | Kumar et al. |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0249820 A1 | 10/2008 | Pathria |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288475 A1 | 11/2008 | Kim et al. |
| 2008/0301643 A1 | 12/2008 | Appleton et al. |
| 2008/0306711 A1 | 12/2008 | Bansal |
| 2008/0313132 A1 | 12/2008 | Hao et al. |
| 2008/0313243 A1 | 12/2008 | Poston et al. |
| 2009/0002492 A1 | 1/2009 | Velipasalar et al. |
| 2009/0006987 A1* | 1/2009 | Simhi ............... G06F 8/38 715/762 |
| 2009/0024962 A1 | 1/2009 | Gotz |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0043801 A1 | 2/2009 | LeClair |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0089651 A1 | 4/2009 | Herberger et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150868 A1 | 6/2009 | Chakra et al. |
| 2009/0164310 A1* | 6/2009 | Grossman ........... G06Q 20/3224 705/7.33 |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0199106 A1 | 8/2009 | Jonsson et al. |
| 2009/0216562 A1 | 8/2009 | Faulkner et al. |

(56) References Cited

U.S. PATENT DOCUMENTS

| | | |
|---|---|---|
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0248737 A1* | 10/2009 | Shukla ................ G06F 9/44 |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313463 A1 | 12/2009 | Pang et al. |
| 2009/0319891 A1 | 12/2009 | MacKinlay |
| 2010/0004857 A1 | 1/2010 | Pereira et al. |
| 2010/0011282 A1 | 1/2010 | Dollard et al. |
| 2010/0042922 A1 | 2/2010 | Bradateanu et al. |
| 2010/0050181 A1* | 2/2010 | Zhang ................ H04L 67/10 718/104 |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070844 A1* | 3/2010 | Aymeloglu ........... G06F 3/0482 715/229 |
| 2010/0070845 A1 | 3/2010 | Facemire et al. |
| 2010/0070897 A1 | 3/2010 | Aymeloglu et al. |
| 2010/0076813 A1 | 3/2010 | Ghosh et al. |
| 2010/0082660 A1* | 4/2010 | Muilenburg .......... G06F 16/337 707/768 |
| 2010/0082778 A1* | 4/2010 | Muilenburg .......... G06Q 10/06 709/220 |
| 2010/0082780 A1* | 4/2010 | Muilenburg .......... G06F 16/958 709/221 |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0138316 A1* | 6/2010 | Connors ............ G06Q 30/0601 705/26.1 |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0198796 A1 | 8/2010 | Berersniewicz et al. |
| 2010/0199225 A1 | 8/2010 | Coleman et al. |
| 2010/0215166 A1* | 8/2010 | Siegel ................ H04M 1/2747 379/205.01 |
| 2010/0217641 A1* | 8/2010 | Siegel ................ G06Q 10/00 705/7.24 |
| 2010/0223260 A1 | 9/2010 | Wu |
| 2010/0228812 A1 | 9/2010 | Uomini |
| 2010/0238174 A1 | 9/2010 | Haub et al. |
| 2010/0250412 A1 | 9/2010 | Wagner |
| 2010/0262901 A1 | 10/2010 | DiSalvo |
| 2010/0280851 A1 | 11/2010 | Merkin |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0306722 A1 | 12/2010 | LeHoty et al. |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0029526 A1 | 2/2011 | Knight et al. |
| 2011/0047159 A1 | 2/2011 | Baid et al. |
| 2011/0047540 A1 | 2/2011 | Williams et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074788 A1 | 3/2011 | Regan et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0106835 A1* | 5/2011 | Lauridsen ............ G06F 16/958 707/769 |
| 2011/0107196 A1 | 5/2011 | Foster |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0161409 A1 | 6/2011 | Nair |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0179048 A1 | 7/2011 | Satlow |
| 2011/0179110 A1* | 7/2011 | Soloway ............ G06F 16/211 709/203 |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0238495 A1 | 9/2011 | Kang |
| 2011/0238553 A1 | 9/2011 | Raj et al. |
| 2011/0251951 A1 | 10/2011 | Kolkowtiz |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0289513 A1* | 11/2011 | Degirmenci ............ G06F 9/542 719/313 |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0004894 A1 | 1/2012 | Butler |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036245 A1* | 2/2012 | Dare ................ H04L 41/5041 709/223 |
| 2012/0036434 A1 | 2/2012 | Oberstein |
| 2012/0050293 A1 | 3/2012 | Carlhian et al. |
| 2012/0054625 A1* | 3/2012 | Pugh ................ H04L 63/0815 715/736 |
| 2012/0059853 A1 | 3/2012 | Jagota |
| 2012/0065987 A1 | 3/2012 | Farooq et al. |
| 2012/0066166 A1 | 3/2012 | Appleton et al. |
| 2012/0072825 A1 | 3/2012 | Sherkin et al. |
| 2012/0079363 A1 | 3/2012 | Foiling et al. |
| 2012/0084117 A1 | 4/2012 | Tavares et al. |
| 2012/0084118 A1 | 4/2012 | Bai et al. |
| 2012/0084184 A1 | 4/2012 | Raleigh |
| 2012/0106801 A1 | 5/2012 | Jackson |
| 2012/0117082 A1 | 5/2012 | Koperda et al. |
| 2012/0123989 A1 | 5/2012 | Yu et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0150759 A1* | 6/2012 | Tarjan ................ G06Q 30/02 705/319 |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0188252 A1 | 7/2012 | Law |

(56) References Cited

U.S. PATENT DOCUMENTS

| | | |
|---|---|---|
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0197657 A1 | 8/2012 | Prodanovic |
| 2012/0197660 A1 | 8/2012 | Prodanovic |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0284345 A1 | 11/2012 | Costenaro et al. |
| 2012/0284670 A1 | 11/2012 | Kashik et al. |
| 2012/0290879 A1 | 11/2012 | Shibuya et al. |
| 2012/0296907 A1 | 11/2012 | Long et al. |
| 2012/0304244 A1 | 11/2012 | Xie et al. |
| 2012/0311684 A1 | 12/2012 | Paulsen et al. |
| 2012/0323829 A1 | 12/2012 | Stokes et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2012/0330994 A1* | 12/2012 | Tonn .............. G06F 9/4488 707/769 |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0055264 A1 | 2/2013 | Burr et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086146 A1* | 4/2013 | Addala ............ H04L 12/4625 709/203 |
| 2013/0086482 A1 | 4/2013 | Parsons |
| 2013/0097482 A1 | 4/2013 | Marantz et al. |
| 2013/0101159 A1 | 4/2013 | Chao et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0124567 A1 | 5/2013 | Balinsky et al. |
| 2013/0150004 A1 | 6/2013 | Rosen |
| 2013/0151148 A1 | 6/2013 | Parundekar et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0187922 A1 | 7/2013 | Sexton |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0288719 A1 | 10/2013 | Alonzo |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2013/0311375 A1 | 11/2013 | Priebatsch |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0089339 A1 | 3/2014 | Siddiqui et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108621 A1* | 4/2014 | Bryan .............. G06F 40/14 709/219 |
| 2014/0108915 A1* | 4/2014 | Lu .............. G06F 3/04815 715/234 |
| 2014/0108985 A1 | 4/2014 | Scott et al. |
| 2014/0129261 A1 | 5/2014 | Bothwell et al. |
| 2014/0129936 A1 | 5/2014 | Richards et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189804 A1* | 7/2014 | Lehmann .............. H04W 12/08 726/4 |
| 2014/0195515 A1 | 7/2014 | Baker et al. |
| 2014/0195887 A1 | 7/2014 | Ellis et al. |
| 2014/0208281 A1 | 7/2014 | Ming |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0229898 A1* | 8/2014 | Terwedo ............ G06F 3/04817 715/835 |
| 2014/0244284 A1 | 8/2014 | Smith |
| 2014/0244388 A1 | 8/2014 | Manouchehri et al. |
| 2014/0267294 A1 | 9/2014 | Ma |
| 2014/0267295 A1 | 9/2014 | Sharma |
| 2014/0279824 A1 | 9/2014 | Tamayo |
| 2014/0282187 A1 | 9/2014 | MacKinlay et al. |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0358829 A1 | 12/2014 | Hurwitz |
| 2015/0019394 A1 | 1/2015 | Unser et al. |
| 2015/0026622 A1 | 1/2015 | Roaldson et al. |
| 2015/0046870 A1 | 2/2015 | Goldenberg et al. |
| 2015/0073954 A1 | 3/2015 | Braff |
| 2015/0089353 A1 | 3/2015 | Folkening |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0112998 A1 | 4/2015 | Shankar et al. |
| 2015/0134666 A1 | 5/2015 | Gattiker et al. |
| 2015/0149888 A1* | 5/2015 | Rice .............. G06F 16/972 715/234 |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186483 A1 | 7/2015 | Tappan et al. |
| 2015/0186821 A1 | 7/2015 | Wang et al. |
| 2015/0187036 A1 | 7/2015 | Wang et al. |
| 2015/0212663 A1 | 7/2015 | Papale et al. |

(56) References Cited

U.S. PATENT DOCUMENTS

| | | | |
|---|---|---|---|
| 2015/0222493 A1* | 8/2015 | Tully | G06F 3/0485 |
| | | | 715/234 |
| 2015/0222693 A1* | 8/2015 | Tully | H04L 65/602 |
| | | | 709/203 |
| 2015/0227295 A1 | 8/2015 | Meiklejohn et al. | |
| 2015/0227299 A1 | 8/2015 | Pourshahid | |
| 2015/0254220 A1 | 9/2015 | Burr et al. | |
| 2015/0278315 A1 | 10/2015 | Baumgartner et al. | |
| 2015/0302051 A1 | 10/2015 | Baumgartner et al. | |
| 2015/0309719 A1 | 10/2015 | Ma et al. | |
| 2015/0317342 A1 | 11/2015 | Grossman et al. | |
| 2015/0324868 A1 | 11/2015 | Kaftan et al. | |
| 2015/0363175 A1* | 12/2015 | Klausner | G06F 8/34 |
| | | | 717/109 |
| 2015/0378966 A1* | 12/2015 | McWilliams | G06F 40/154 |
| | | | 715/236 |
| 2016/0048370 A1* | 2/2016 | Zenoff | G06F 1/1652 |
| | | | 715/734 |
| 2016/0062555 A1 | 3/2016 | Ward et al. | |
| 2016/0098176 A1 | 4/2016 | Cervelli et al. | |
| 2016/0110369 A1 | 4/2016 | Cervelli et al. | |
| 2016/0162478 A1* | 6/2016 | Blassin | G06Q 10/06311 |
| | | | 706/12 |
| 2016/0162519 A1 | 6/2016 | Stowe et al. | |
| 2017/0103432 A1* | 4/2017 | Borchetta | G06Q 30/0269 |
| 2017/0111241 A1* | 4/2017 | Degioanni | H04L 41/5009 |
| 2017/0200240 A1* | 7/2017 | Marinelli | H04L 41/0681 |
| 2017/0366916 A1* | 12/2017 | Dong | G06F 16/9562 |
| 2018/0024701 A1 | 1/2018 | Sanches et al. | |
| 2018/0024731 A1 | 1/2018 | Sanches et al. | |
| 2018/0032605 A1* | 2/2018 | Deshpande | G06F 16/338 |
| 2018/0032627 A1* | 2/2018 | Margatan | H04L 67/10 |
| 2018/0060523 A1* | 3/2018 | Farh | G16H 80/00 |
| 2018/0081642 A1* | 3/2018 | Alurralde Iturri | G06F 8/35 |
| 2018/0101279 A1 | 4/2018 | Ward et al. | |
| 2018/0137199 A1* | 5/2018 | Miller | G06Q 50/01 |
| 2018/0164997 A1* | 6/2018 | Sinha | G06F 9/44526 |
| 2018/0176078 A1* | 6/2018 | Nigro | H04L 67/303 |
| 2018/0181270 A1* | 6/2018 | Muramoto | G06F 3/0481 |
| 2019/0095225 A1* | 3/2019 | Nandagopal | G06F 40/137 |
| 2019/0332230 A1* | 10/2019 | Gueco | G06F 9/45512 |

FOREIGN PATENT DOCUMENTS

| | | |
|---|---|---|
| DE | 102014103482 | 9/2014 |
| DE | 102014215621 | 2/2015 |
| EP | 1672527 | 6/2006 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2940603 | 11/2015 |
| EP | 2940609 | 11/2015 |
| EP | 2993595 | 3/2016 |
| EP | 3002691 | 4/2016 |
| EP | 3009943 | 4/2016 |
| EP | 3273345 | 1/2018 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 01/025906 | 4/2001 |
| WO | WO 2001/088750 | 11/2001 |
| WO | WO 2002/065353 | 8/2002 |
| WO | WO 2005/104736 | 11/2005 |
| WO | WO 2007/133206 | 11/2007 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/030914 | 3/2010 |
| WO | WO 2012/119008 | 9/2012 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, pp. 2.

About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.

Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.

Alur et al., "Chapter 2: IBM InfoSphere DataStage Stages," IBM InfoSphere DataStage Data Flow and Job Design, Jul. 1, 2008, pp. 35-137.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Bluttman et al., "Excel Formulas and Functions for Dummies," 2005, Wiley Publishing, Inc., pp. 280, 284-286.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Butkovic et al., "Using Whois Based Geolocation and Google Maps API for Support Cybercrime Investigations," Recent Advances in Telecommunications and Circuits: Proceedings of the 11th International Conference on Applied Electromagnetics, Wireless and Optical Communications (Electroscience '13), Proceedings of the 2nd International Conference on Circuits, Systems, Communications, Computers and Applications (CSCCA '13), Proceedings of the 1st International Conference on Solid State Circuits (SSC '13), Proceedings of the 1st International Conference on Antennas & Propagation (ANPRO '13) :Dubrovnik, Croatia, Jun. 25-27, 2013, pp. 194-200, 2013.

Canese et al., "Chapter 2: PubMed: The Bibliographic Database," The NCBI Handbook, Oct. 2002, pp. 1-10.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Definition "Identify", downloaded Jan. 22, 2015, 1 page.

Definition "Overlay", downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Elias et al., "Exploration Views: Understanding Dashboard Creation and Customization for Visualization Novices," Sep. 5, 2011, Network and Parallel Computing, pp. 274-291.

"The FASTA Program Package," fasta-36.3.4, Mar. 25, 2011, pp. 29.

(56) References Cited

OTHER PUBLICATIONS

Griffith, Daniel A., "A Generalized Huff Model," Geographical Analysis, Apr. 1982, vol. 14, No. 2, pp. 135-144.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
JetScreenshot.com, "Share Screenshots via Internet in Seconds," <http://web.archive.org/web/20130807164204/http://www.jetscreenshot.com/>, Aug. 7, 2013, pp. 1.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Kwout, <http://web.archive.org/web/20080905132448/http://www.kwout.com/> Sep. 5, 2008, pp. 2.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Microsoft Windows, "Microsoft Windows Version 2002 Print Out 2," 2002, pp. 1-6.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents", 6 pages, 2002.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Nolan et al., "MCARTA: A Malicious Code Automated Run-Time Analysis Framework," Homeland Security, 2012 IEEE Conference on Technologies for, Nov. 13, 2012, pp. 13-17.
Online Tech Tips, "Clip2Net—Share files, folders and screenshots easily," <http://www.online-tech-tips.com/free-software-downloads/share-files-folders-screenshots/>, Apr. 2, 2008, pp. 5.
Oracle Corporation: "MySQL Workbench", Mar. 15, 2016, pp. 1-408, XP055495553, Retrieved from the Internet: URL: https://web.archive.org/web/20160628032348/http://downloads.mysql.com/docs/workbench-en.a4.pdf [retrieved on Jul. 26, 2018].
O'Reilly.com, http://oreilly.com/digitalmedia/2006/01/01/mac-os-x-screenshot-secrets.html published Jan. 1, 2006 in 10 pages.
Palmas et al., "An Edge-Bunding Layout for Interactive Parallel Coordinates" 2014 IEEE Pacific Visualization Symposium, pp. 57-64.
Perdisci et al., "Behavioral Clustering of HTTP-Based Malware and Signature Generation Using Malicious Network Traces," USENIX, Mar. 18, 2010, pp. 1-14.
Red Gate, "Analyzing Change Impact with SQL Dependency Tracker," Dec. 22, 2010, https://web.archive.org/web/20101222043638/http://www.red-gate.com/products/sql-development/sql-dependency-tracker/screenshots.
Rouse, Margaret, "OLAP Cube," <http://searchdatamanagement.techtarget.com/definition/OLAP-cube>, Apr. 28, 2012, pp. 16.
Schroder, Stan, "15 Ways To Create Website Screenshots," <http://mashable.com/2007/08/24/web-screenshots/>, Aug. 24, 2007, pp. 2.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
SnagIt, "SnagIt, 8.1.0 Print Out 2," Software release date Jun. 15, 2006, pp. 1-3.
SnagIt, "SnagIt, 8.1.0 Print Out," Software release date Jun. 15, 2006, pp. 6.
SnagIt, "SnagIt, Online Help Guide," <http://download.techsmith.com/snagit/docs/onlinehelp/enu/snagit_help.pdf>, TechSmith Corp., Version 8.1, printed Feb. 7, 2007, pp. 284.
Umagandhi et al., "Search Query Recommendations Using Hybrid User Profile with Query Logs," International Journal of Computer Applications, vol. 80, No. 10, Oct. 1, 2013, pp. 7-18.
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Wright et al., "Palantir Technologies VAST 2010 Challenge Text Records_Investigations into Arms Dealing," Oct. 29, 2010, pp. 1-10.
Yang et al., "HTML Page Analysis Based on Visual Cues", A129, pp. 859-864, 2001.
"A Word About Banks and the Laundering of Drug Money," Aug. 18, 2012, http://www.golemxiv.co.uk/2012/08/a-word-about-banks-and-the-laundering-of-drug-money/, pp. 1-5.
Abbey, Kristen, "Review of Google Docs," Currents in Electronic Literacy, Digital Writing and Research Lab at the University of Texas at Austin, May 1, 2007, pp. 1-2.

(56) References Cited

OTHER PUBLICATIONS

Acklen, Laura, "Absolute Beginner's Guide to Microsoft Word 2003," Que Publishing, Dec. 24, 2003, pp. 15-18, 34-41, 308-316.
Amnet, "5 Great Tools for Visualizing Your Twitter Followers," https://web.archive.org/web/20110523074129/http://www.amnetblog.com/sections/46-social-media/115-5-great-tools-for-visualizing-your-twitter-followers.html, retrieved on Sep. 24, 2020, pp. 1-4.
Boyce, Jim, "Microsoft Outlook 2010 Inside Out," Aug. 1, 2010, retrieved from the internet https://capdtron.files.wordpress.com/2013/01/outlook-2010-inside_out.pdf, pp. 32-36.
Celik, Tantek, "CSS Basic User Interface Module Level 3 (CSS3 UI)," Jan. 17, 2012, retrieved from internet http://www.w3.org/TR/2012/WD-css3-ui-20120117/#resizing-amp-overflow retrieved on May 18, 2015, pp. 8-58.
Conner, Nancy, "Google Apps: The Missing Manual," O'Reilly Media, Inc., May 1, 2008, pp. 93-97, 106-113.
Cox et al., "Step by Step Microsoft Access 2013," 2013, Microsoft Press, pp. 197-225.
Ferreira et al., "A Scheme for Analyzing Electronic Payment Systems," Brasil 1997, pp. 1-8.
Galliford, Miles, "SnagIt, Versus Free Screen Capture Software: Critical Tools for Website Owners," <http://www.subhub.com/articles/free-screen-capture-software>, Mar. 27, 2008, pp. 1-9.
Gesher, Ari, "Palantir Screenshots in the Wild: Swing Sightings," The Palantir Blog, Sep. 11, 2007, pp. 1-6.
GIS-NET3. Department of Regional Planning. Planning & Zoning Information for Unincorporated LA County. Retrieved Oct. 2, 2013 from http://gis.planning.lacounty.gov/GIS-NET3_Public/Viewer.html, pp. 1-2.
Goswami, Gautam, "Quite Writely Said!," One Brick at a Time, Aug. 21, 2006, pp. 1-2.
"GrabUp—What a Timesaver!" <http://atlchris.com/191/grabup/>, Aug. 11, 2008, pp. 1-2.
Groh, "Microsoft Access 2010 Bible," 2010, Wiley Publishing Inc., pp. 129-170.
Gu et al., "Record Linkage: Current Practice and Future Directions," CSIRO Mathematical and Information Sciences, CMIS Technical Report No. 03/83, Jan. 15, 2004, pp. 1-20, 26-32.
Hansen et al., "Analyzing Social Media Networks with NodeXL: Insights from a Connected World", Elsevier Science, Chapter 4, pp. 53-67 and Chapter 10, pp. 143-164, published Sep. 2010.
Harvey, "Excel 2010 All-in-One for Dummies," 2010, Wiley Publishing, Inc., pp. 616-633.
Kelly, Microsoft—Developer Network, "Getting Started with VBA in Word 2010," Apr. 2010, <http://msdn.microsoft.com/en-us/library/ff604039%28voffice.14%29.aspx> as retrieved on Apr. 4, 2014, pp. 1-16.
Levi, "Money Laundering Risks and E-Gaming: A European Overview and Assessment," 2009, http://www.cf.ac.uk/socsi/resources/Levi_Final_Money_Laundering_Risks_egaming.pdf, pp. 4-26.
Olanoff, Drew, "Deep Dive with the New Google Maps for Desktop with Google Earth Integration, It's More than Just a Utility," TechCrunch, May 15, 2013, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/, pp. 1-6.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf, pp. 1-6.
Quest, "Toad for Oracle 11.6—Guide to Using Toad," Quest Software, Inc., Sep. 24, 2012, pp. 5-162.
Red Gate, "Analyzing Change Impact with SQL Dependency Tracker," Dec. 22, 2010, https://web.archive.org/web/20101222043638/http://www.red-gate.com/products/sql-development/sql-dependency-tracker/screenshots, pp. 1-5.
Red Gate, "SQL Dependency Tracker 2.5," Dec. 22, 2010, https://web.archive.org/web/201012151355/http://www.red-gate.com/products/sql-development/sql-dependency-tracker/, pp. 1-2.
Red Gate, "Understanding the Diagram," May 14, 2015, https://web.archive.org/web/20150514124543/http://documentation.red-gate.com/display/SDT2/Understanding+the+diagram, pp. 1-3.
Red Gate, "Worked Example—A Simple Analysis," Dec. 2, 2014, https://web.archive.org/web/20141202121918/http://documentation.red-gate.com/display/SDT2/Worked+example+-++a+simple+analysis, pp. 1-8.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015, p. 1.
Sempf, "Visual Basic 2005 for Dummies," 2006, Wiley Publishing, Inc., pp. 83-105, 125-139.
Service Now, "Access dependency maps," Apr. 14, 2017, https://docs.servicenow.com/bundle/geneva-it-operations-management/page/product/discovery/task/t_AccessDependencyMaps.html, p. 1.
Simpson, "Access VBA Programming for Dummies," 2004, Wiley Publishing, Inc., pp. 117-146, 297-315.
Symantec Corporation, "E-Security Begins with Sound Security Policies," Announcement Symantec, Jun. 14, 2001, pp. 2-12 (also labeled as pp. 1-20).
Thompson, Mick, "Chapter 2. Geographic Data," Getting Started with GEO, CouchDB, and Node.js, O'Reilly Media, Jul. 26, 2011, pp. 1-3.
Thornber et al., "Include Browser," Apr. 5, 2014, https://sourceforge.net/projects/sourcenav/files/NG4.4/(second download file "sourcenavigator-NG4.4-i686-opt.tar.bz2") /SN-NG4.4/share/snavigator/html/userguide/inclbrws.html, pp. 1-4.
Thornber et al., "Source Navigator NG," Apr. 5, 2014, https://sourceforge.net/projects/sourcenav/files/NG4.4/, p. 1.
Wikipedia, "Federated Database System," Sep. 7, 2013, retrieved from the internet on Jan. 27, 2015, http://en.wikipedia.org/w/index.php?title=Federated_database_system&oldid=571954221, pp. 1-6.
Chaudhuri et al., "An Overview of Business Intelligence Technology," Communications of the ACM, Aug. 2011, vol. 54, No. 8, pp. 88-98.

* cited by examiner

FIG. 2

```
200
  202
    mappedHomepages:
    - principals: [_catch_all]      206
      homepage:
        import_value:
          file: /general.yml
    - key: applications
      principals: [_catch_all]
      homepage:
        type: simple
        simple:
          nav:
            showHead: false
          sections:
          - browseLink:              208
              linkText: "View all apps"
              linkUrl: "{{homeAppUrl}}"
            universe:
              kind: displayPlaceholder
          - title: "Launch Apps"
            universe:
              kind: static
            spec:
              resourceList:
                import_value:
                  file: /apps.yml
                  jsonPath: "$.allApps.*.rid"     210
                  many: true
                  ...
```

```
204
  mappedHomepages:
  - principals:
    - e610c5be-5e6c-4169-bb87-9c493bb607b3
    homepage:
      type: simple
      simple:
        sections:
        - title: "Your Favorites"                                              216
          description: "All the things you've favorited in the data pipeline"
          universe:
            kind: documentFavorites
        - title: "Your Resources"                                              218
          universe:
            kind: static
          spec:
            resourceList:
              - ri.main.folder.a8485288-2b94-45a7-a69c-3d052bbc257c
              - ri.blob.main.image.095d0a1d-e2fa-4e85-8e5e-88a53e81348f
              - ri.main.analysis.0543097-01fe-4ae3-a3fc-f5d6c02ef5bc
              - ri.main.collection.b3ee2a1b-a765-4df0-9092-17afe7d93d90
              - ri.timeseries.main.analysis.ba484b9cffa13f0b80d408
        - title: "Your Recent Files"                                           220
          universe:
            kind: documentRecents
        - title: "Your Team Folder"                                            222
          kind: documentFolder
          spec:
            rid: ri.main.folder.3e351bc0-afc6-406f-8ac9-a0fc2d60687b
                                                                      212
  - principals: [_catch_all]                      214
    homepage:
      import_value:
        file: /general.yml
  - key: applications
    principals: [_catch_all]
    homepage:
      type: simple
      ...
```

Welcome to your Data Pipeline Home Page

NAVIGATION
- Jump back in
- Announcements
- My Favorites
- Pull Requests
- Pipeline Audit Templates

Hello Jane - Jump back in See all recent files
Your recently modified files in the Data Pipeline Users/jdoe/auto-save/
🗋 Analysis[2018-02-12 at 10:00:12 PM]

Users/jdoe/auto-save/
🗋 Raw Data [2018-01-23 at 1:00:49 PM]

Users/jdoe/auto-save/
🗋 Document 2 [2018-01-18 at 3:30:19 PM]

Users/jdoe/auto-save/
🗋 Analysis[2018-02-12 at 7:30:12 PM]

Users/jdoe/auto-save/
🗋 Investigation [2018-01-22 at 4:30:12 PM]

Users/jdoe/auto-save
🗋 Document Summary [2018-01-18 at 1:00:00 Pm]

Users/jdoe/auto-save/
🗋 Analysis [2018-02-12 at 5:17:30 PM]

Users/jdoe/auto-save/
🗋 Document 1 [2018-01-21 at 1:00:15 AM]

Announcements See all announcements
02/01/2018 at 7:14 AM by officially
Python transforms have been added to the data pipeline system.
Python is a language with plenty of available documentation. Users may want to write data transformation in python so that they can take advantage of the language-specific capabilities and libraries. The python API is lower level than other Languages like SQL.Here are some Key benefits of using python:

○ The transforms Python Library is an API that exposes functionalities such as file reads and writes.File based data transformation can be useful early on in data transformation pipelines when you want to parse and clean data
  ○ There is first-class support for using external libraries.

FIG. 4A

GRAPHICAL USER INTERFACE CONFIGURATION SYSTEM

INCORPORATION BY REFERENCE TO ANY PRIORITY APPLICATIONS

This application claims benefit of U.S. Provisional Patent Application Ser. No. 62/640,464 entitled "Graphical User Interface Configuration System" filed Mar. 8, 2018, which is hereby incorporated by reference in its entirety.

Any and all applications for which a foreign or domestic priority claim is identified in the Application Data Sheet as filed with the present application are hereby incorporated by reference under 37 CFR 1.57.

BACKGROUND

In the area of computer-based platforms, markup language can be used to create web pages.

SUMMARY

The systems, methods, and devices described herein each have several aspects, no single one of which is solely responsible for its desirable attributes. Without limiting the scope of this disclosure, several non-limiting features will now be discussed briefly.

According to an embodiment, a method for generating a page for a user group is disclosed comprising: receiving user login data; determining a user group from the user login data; retrieving a configuration file for the user group; determining, from the configuration file, a page definition comprising a first configuration section and a second configuration section; generating, from the first configuration section, a first page section, wherein generating the first page section further comprises: transmitting a content request comprising the user login data; and in response to transmitting the content request, receiving first content, wherein the first page section comprises the first content; generating, from the second configuration section, a second page section comprising second content; and generating a user group page comprising the first page section and the second page section, wherein the method is performed by one or more computer hardware processors.

According to an aspect, generating the second page section may further comprise: identifying, from the second configuration section, a resource identifier; retrieving resource metadata for the resource identifier; and generating a markup element from the resource metadata, the second content comprising the markup element.

According to another aspect, the method may further comprise: storing the configuration file as a first version configuration file identifiable by a first version identifier; receiving a modification to the configuration file; storing the modification as a second version configuration file identifiable by a second version identifier; receiving a first request comprising the first version identifier; in response to receiving the first request, causing presentation of the user group page associated with the first version configuration file identifiable by the first version identifier; receiving a second request comprising the second version identifier; and in response to receiving the second request, causing presentation of a modified user group page associated with the second version configuration file identifiable by the second version identifier.

According to yet another aspect, the method may further comprise: storing the configuration file as a first version configuration file identifiable by a first version identifier; receiving a modification to the configuration file; storing the modification as a second version configuration file identifiable by a second version identifier; receiving a first request; in response to receiving the first request, causing presentation of the user group page associated with the first version configuration file identifiable by the first version identifier; receiving a second request comprising the second version identifier; and in response to receiving the second request, causing presentation of a modified user group page associated with the second version configuration file identifiable by the second version identifier.

According to yet another aspect, the method may further comprise: in response to receiving the first request, determining that the first version configuration file identifiable by a first version identifier is a default version for the first request.

According to yet another aspect, the first content may further comprise at least one of: a recent resource, contents of a folder, a favorited resource, or a recently modified resource.

According to yet another aspect, the second content may further comprise a resource from a data pipeline system, the method may further comprise: receiving a dataset; and generating the resource, wherein generating the resource comprises: applying a transformation to the dataset, wherein the output of the transformation comprises a modified dataset, the resource comprising the modified dataset.

According to yet another aspect, the page definition may further comprise a third configuration section, the method may further comprise: generating, from the third configuration section, a third page section, wherein generating the third page section further comprises: determining a geographic region from the user login data; and identifying third content with a tag for the geographic region, wherein the third page section comprises the third content and the user group page comprises the third page section.

According to yet another aspect, at least one of the first content or the second content may comprise an application link, an announcement, a folder, a data catalog, a data request, a data build, a data issue, a file, an image, a report, or a document.

According to another embodiment, a system is disclosed comprising: a non-transitory computer storage medium configured to at least store computer-executable instructions; and one or more computer hardware processors in communication with the non-transitory computer storage medium, the one or more computer hardware processors configured to execute the computer-executable instructions to at least: receive user login data for a user profile; determine a user group from the user login data; retrieve a configuration file for the user group; determine, from the configuration file, a page definition comprising a first configuration section and a second configuration section; generate, from the first configuration section, a first page section, wherein generating the first page section further comprises: transmitting a content request for the user profile; and in response to transmitting the content request, receiving first content, wherein the first page section comprises the first content; generate, from the second configuration section, a second page section comprising second content for the user group; and generate a user group page comprising the first page section and the second page section.

According to an aspect, generating the second page section may further comprise: identifying, from the second configuration section, a resource identifier; retrieving resource metadata for the resource identifier; and generating a markup element from the resource metadata, the second content comprising the markup element.

According to another aspect, the one or more computer hardware processors may be further configured to: store the configuration file as a first version configuration file identifiable by a first version identifier; receive a modification to the configuration file; store the modification as a second version configuration file identifiable by a second version identifier; receive a first request; in response to receiving the first request, cause presentation of the user group page associated with the first version configuration file identifiable by the first version identifier; receive a second request comprising the second version identifier; and in response to receiving the second request, cause presentation of a modified user group page associated with the second version configuration file identifiable by the second version identifier.

According to yet another aspect, the first request may comprise the first version identifier.

According to yet another aspect, the one or more computer hardware processors may be further configured to: in response to receiving the first request, determine that the first version configuration file identifiable by a first version identifier is a default version for the first request.

According to yet another aspect, the first content may further comprise at least one of: a recent resource, contents of a folder, a favorited resource, or a recently modified resource.

According to yet another aspect, the second content may comprise a resource from a data pipeline system, and wherein the one or more computer hardware processors may be further configured to: receive a dataset; and generate the resource, wherein generating the resource comprises: applying a transformation to the dataset, wherein the output of the transformation comprises a modified dataset, the resource comprising the modified dataset.

According to yet another aspect, the page definition may further comprise a third configuration section, and wherein the one or more computer hardware processors may be further configured to: generate, from the third configuration section, a third page section, wherein generating the third page section further comprises: determining a geographic region from the user login data; and identifying third content with a tag for the geographic region, wherein the third page section comprises the third content and the user group page comprises the third page section.

According to yet another aspect, at least one of the first content or the second content may comprise an application link, an announcement, a folder, a data catalog, a data request, a data build, a data issue, a file, an image, a report, or a document.

Accordingly, in various embodiments, large amounts of data can be automatically and dynamically calculated, and the calculated data is efficiently and compactly presented to a user by the system. Thus, in some embodiments, the user interfaces described herein are more efficient as compared to previous user interfaces in which data is not dynamically updated and compactly and efficiently presented to the user.

Further, as described herein, the system may be configured and/or designed to generate user interface data useable for rendering the various user interfaces described. The user interface data may be used by the system, and/or another computer system, device, and/or software program (for example, a browser program), to render the user interfaces. The user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The dynamic user interfaces include improved human-computer interactions that may provide reduced mental workloads, improved decision-making, reduced work stress, and/or the like, for a user. For example, the user interfaces described herein may provide time-varying report-related information and may enable a user to more quickly access, navigate, assess, and digest such information than previous systems. Further, the dynamic user interfaces described herein are enabled by innovations in efficient interactions between the user interfaces and underlying systems and components. The presentation of data via the user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on efficient generation of user interfaces from configuration files. Such features and others (e.g., processing and analysis of large amounts of electronic data) are intimately tied to, and enabled by, computer technology, and would not exist except for computer technology. For example, the dynamic generation of user interfaces described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 2 depicts example configurations, according to some embodiments of the present disclosure.

FIGS. 4A-4B illustrate an example technical graphical user interface, according to some embodiments of the present disclosure.

DETAILED DESCRIPTION

Overview

Figure 1:
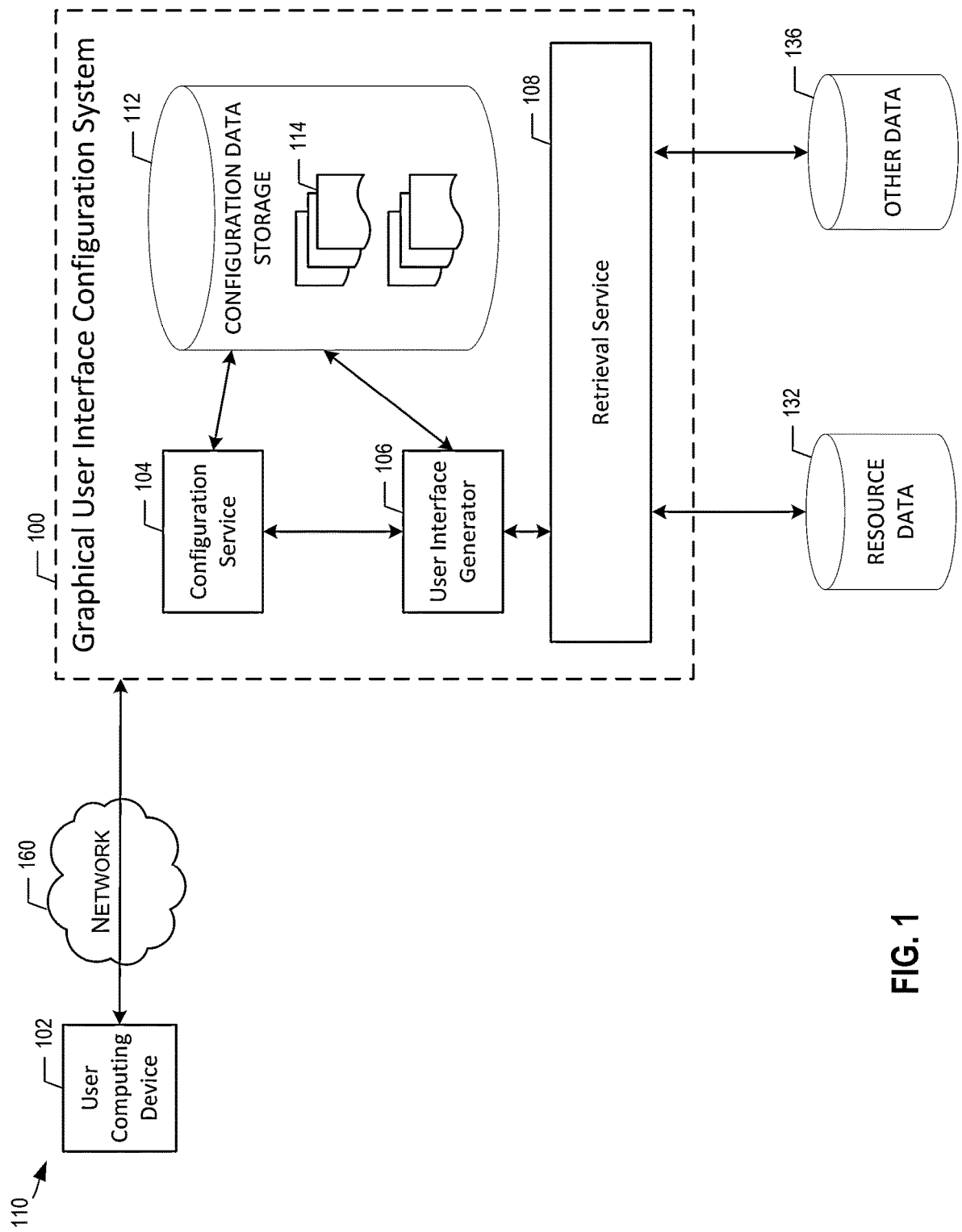
FIG. 1 is a block diagram illustrating an example graphical user interface configuration system, according to some embodiments of the present disclosure.

Although certain preferred embodiments and examples are disclosed below, inventive subject matter extends beyond the specifically disclosed embodiments to other alternative embodiments and/or uses and to modifications and equivalents thereof Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

A user may visit a home page for information and navigation purposes. In the context of an organization, the organization typically has a single home page that all of its users to visit. A home page is typically a complex page that is written in a combination of languages, such as a markup language and a scripting language. The home page typically includes thousands of lines of HTML and JavaScript that grows and becomes even more complex over time. The myriad of HTML elements and scripting instructions are also typically arranged in a complex and interconnected manner. Thus, deploying and/or making changes directly to markup pages can be a complex and time-consuming task. Moreover, there can be a single home page for every user, even though different types of users may have different requirements for a home page. Accordingly, a user interface solution that is easily customizable and/or extensible would be advantageous.

Disclosed herein are systems and methods that may be used to advantageously provide customizable user interfaces. The customizable user interfaces, such as a home page, can be defined by one or more configuration files. When a user requests their user interface, a configuration service can retrieve a particular configuration for the user. The configuration may define a user interface for a group of users. A user interface can be generated from the configuration. The configuration can include multiple configuration sections, where each configuration section can define respective page sections. Content can be retrieved based on the configuration. The content can be retrieved based on resource identifiers. Content can also be retrieved from application programming interfaces that can dynamically return resources. In retrieving content, access control lists can be used to determine content that a particular user is authorized to view. The configuration can be versioned. Creation of new configurations or changes to existing configurations can be rapidly deployed and the corresponding user interfaces from the updated configurations can be made available to users within seconds of being deployed. Deployment of such configurations can be accomplished without or before rebuilding or recompiling an entire application, such as a web application.

As mentioned above, users may visit a home page. A home page with many features can be a complex document. For example, the home page may include thousands of lines of HTML and JavaScript instructions and may require many hours of development time to create, update, and test. Creating a home page with markup instructions requires a developer or a team of developers to understand elements, tags, styling instructions, and other concepts at a detailed level. Further, creating a home page with rich functionality typically requires understanding one or more programming languages (such as scripting languages) at a detailed level and also may require additional complex programming to integrate the home page with one or more external services. Creating multiple home pages with different features for different users can take a similar amount of development time to create, update, and test each customized implementation.

Accordingly, the systems and techniques described herein may improve computer technology and/or the configuration of graphical user interfaces. For example, a graphical user interface figuration system may enable quick deployment of multiple user interfaces based on high-level configuration. In some embodiments, instead of a developer having to construct a home page with thousands of lines of markup and scripting instructions, an administrator can quickly deploy new or modified customized home pages with high-level configuration instructions that are a fraction of the low-level instructions that are required in other graphical user interface systems. Further, as soon as the configuration has been saved, the system can present a customized user interface corresponding to the configuration without or before rebuilding or recompiling an entire application, such as a web application. Thus, the systems and techniques described herein can include one or more particular ways for efficiently configuring customized user interfaces in contrast to conventional methods for creating user interfaces.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Page: A document that is displayable by a user interface application. A page can be written in in a markup language, such as HTML, and/or can include scripting language, such as JavaScript. A page can be displayable by a web browser application. Example pages are described in further detail below with respect to FIGS. 3, 4A, 4B, and 5. An example page can be a user group page. A user group page can be a page that is customized for a group of users, which can include a single user. Users may be assigned to one or more user groups and/or each user group may have a page or page configuration. As described herein, a user can generically request a page, and the system can determine the appropriate page and/or page configuration for the user, such as a particular user group page and/or page configuration. A user group page can be customized for an analytical user, such as a user that is not necessarily familiar with coding, but rather is comfortable with spreadsheets applications and other point-and-click analytical applications. The user group page for an analytical user can include links to point-and-click applications, template analyses, data catalogs, and other analyses and reports for an analytical user. Another user group page can be customized for a technical user, such as a user that is comfortable with writing code and/or queries, such as Java or Python code or SQL queries. The user group page for a technical user can include links to recently modified files, technical announcements, favorite documents, favorite technical applications, data pull requests, data audit templates, and/or other technical content or applications. Yet another user group page can be customized for a non-technical user, such as a user that prefers to see large links to applications and/or announcements that may be relevant to the user. The user group page for a non-technical user can include announcements and/or large links or icons to commonly used applications.

Example Graphical User Interface Configuration System

FIG. 1 illustrates a graphical user interface configuration system 100 ("GUI system 100"), according to some embodiments of the present disclosure. In the embodiment of FIG. 1, the computing environment 110 includes a network 160, a GUI system 100, a user computing device 102, and data storage devices, such as a resource data storage 132 and/or other data storage devices 136.

Various communications between these devices are illustrated. For example, the user computing device 102 may send a request to the GUI system 100 and the GUI system 100 may send a response to the user computing device 102. The user computing device 102 may transmit a page request, such as a home page request to the GUI system 100. The user computing device 102 may transmit user login data to the GUI system 100. The page request can include the user login data or the user login data may be sent separately from the page request. Other communications between these devices are described in further detail below.

The example GUI system 100 includes a configuration service 104, a user interface generator 106, a retrieval service 108, and a configuration data storage 112. As described above, the GUI system 100 receives a request and/or user login data. The configuration service 104 can use the user login data to retrieve a configuration 114 from the configuration data storage 112. As described herein, the configuration 114 can be represented within a configuration file, such as a YAML (YAML Ain't Markup Language) file, which is a human-readable data serialization language. The user interface generator 106 can generate a graphical user interface based on the configuration 114. For example, instructions within the configuration 114 can indicate that the retrieval service 108 should retrieve particular resources and/or call application programming interfaces (APIs) that can return data to be presented in the graphical user interface. The configuration 114 can specify particular resources or other data to be retrieved from the data storages 132, 136. By calling APIs, the retrieval service 108 can dynamically retrieve resources or other data from the data storages 132, 136, such as recent files, favorited data, or other items that can be dynamically returned.

The GUI system 100 can be used in the context of a data pipeline. Additional details and embodiments regarding the GUI system 100 in conjunction with a data pipeline system are described in further detail below with respect to FIG. 7.

Example Graphical User Interface Configuration

FIG. 2 depicts example configurations, according to some embodiments of the present disclosure. In FIG. 2, the configuration environment 200 includes a first configuration container 202 and a second configuration container 204. The configuration containers 202, 204 can be configuration files. The configuration containers 202, 204 may correspond to one or more data formats. The example format of the configuration containers 202, 204 may generally correspond to a YAML data format. The configuration containers 202, 204 may be illustrative and may not conform exactly to one or more particular data formats, such as the YAML format. While not illustrated, the configuration containers 202, 204 may be in XML, JSON, or any other data format.

A configuration container can include multiple page definitions. The configuration container 202 includes a first page definition 206 and a second page definition 208. The ellipsis 210 represents that the configuration container 202 can include further definitions for the page definition 208 and/or additional page definitions. A page definition can include permissions data specifying one or more users and/or user groups that can access the page for the particular page definition. For example, the first page definition 208 can include the key and value "principles" and "_catch all" as a default permission for all users. The page definitions can include key-value data, text data, reference data, links, variables, and/or other types of data for configuring a page, which are described in further detail herein. The page definitions can further correspond to the user interfaces described in further herein. In some embodiments, a first configuration container (such as a configuration file) can refer to (thereby incorporating) a second configuration container, such as by including a reference to the second configuration container.

Configurations can easily be added or modified. The second configuration container 204 can be a modification of the first configuration container 202. The second configuration container 204 can be similar to the first configuration container 202 in some aspects. For example, some of the page definitions in the second configuration container 204 can be the same as some of the page definitions in the first configuration container 202. However, the third page definition 212 can be an addition to the second configuration container 204. By adding the third page definition 212, a completely new page can be defined.

The third page definition 212 can be different from the other page definitions 206, 208 in some aspects. The third page definition 212 can include permissions data for a specific user group. For example, the third page definition 212 can include the key and value "principles" and "e610c5be-5e6c-4169-bb87-9c493bb607b3". The identifier, "e610c5be-5e6c-4169-bb87-9c493bb607b3," can be indicative of a user group that is mapped to one or more users that authorizes that user group to view the page associated with the third page definition 212. A permissions database may include mappings from user group identifiers to user identifiers. A user interface may enable an administrator to authorize and/or manage permissions for users and user groups. The user interface may modify the permissions database, which may include identifiers that can be referenced in the configurations, such as the configuration containers and/or page definitions.

A page definition can include one or more configuration sections. One or more page sections can be generated from the configuration sections. The third page definition 212 includes a first configuration section 216, a second configuration section 218, a third configuration section 220, and a fourth configuration section 222. There can be different types of configuration sections, such as sections that refer to APIs that can dynamically retrieve one or more resources or sections that define content more statically, such as a list of resources. The first configuration section 216 can be a favorite documents type of configuration section, which is indicated by the "documentFavorites" text value. Based on the configuration section 216, the GUI system 100 can transmit a content request, which can optionally include user login data, to retrieve one or more resources for a particular user profile, such as the favorited documents. As described herein, the user login data can be used for identification and/or authorization purposes. In response to transmitting the content request, the GUI system 100 can receive first content, such as a list of favorited documents, which can be represented on the generated page. In contrast to some content that is for a specific user, content for a page section can be for a user group generally (such as an application links section for an entire user group as opposed to a user-specific document folder). Some configuration sections can be generally more directed towards static content. For example, the second configuration section 218 can be a static resources type of configuration section. As shown, the second configuration section 218 includes a "resourceList" that has a list of resource identifiers, which can be retrieved by the GUI system 100 for presentation on the generated page. The order of the configuration sections in the page definition can also indicate an order for the respective page sections in a generated page.

There may be other types of configuration sections. The third and fourth configuration sections 220, 222, may be similar to the first configuration section 216 in that they may also refer to APIs that can dynamically retrieve one or more resources. The third configuration section 220 can be a recent documents type of configuration section, which is indicated by the "documentRecents" text value. The fourth configuration section 222 can be a folder type of configuration section, which is indicated by the "documentFolder" text value. Similar to the API call that was indicated by the first configuration section 216, each of the third and fourth configuration sections 220, 222 can refer to API calls to retrieve recent documents or documents from a folder, respectively. Again, similar to the API call indicated by the first configuration section 216 that used user login data, the API calls for the third and fourth configuration sections 220, 222 can also use login data for identification and/or authorization purposes.

The example configurations described herein can enable the rapid creation of customized user interfaces. For example, the first configuration section 216 and the third configuration section 218 are many times shorter than the corresponding markup language elements that may be necessary to accomplish something similar in another GUI framework. The "kind: documentFavorites" and "kind: documentRecents" are short configuration sections and can result in entire page sections that include multiple visual representations of resources and corresponding information. For example, the third configuration section 218 regarding recent files can cause a similar page section to be generated similar to the page section 404 of FIG. 4A. To write such a section manually in a markup language may require thousands of lines of a markup language like HTML and thousands of lines of a scripting language like JavaScript to communicate with various APIs to dynamically retrieve content. Accordingly, as described in further detail with respect to FIG. 6, brief configurations can also be quickly deployed and can result in customized user interfaces being available to users rapidly and an rapid configuration experience for page administrators.

Example Graphical User Interfaces

FIGS. 3, 4A-4B, and 5 illustrate example user interfaces of the GUI system 100, according to some embodiments of the present disclosure. In particular, FIGS. 3, 4A-4B, and 5 illustrate example user interfaces of the GUI system 100 that are configured via configuration containers. In various embodiments, aspects of the user interfaces may be rearranged from what is shown and described below, and/or particular aspects may or may not be included. However, the embodiments described below in reference to FIGS. 3, 4A-4B, and 5 provide example user interfaces of the GUI system 100. The user interfaces of FIGS. 3, 4A-4B, and 5, such as, user interfaces 300, 400, and 500 may have similar user interface elements and/or capabilities.

Figure 3:
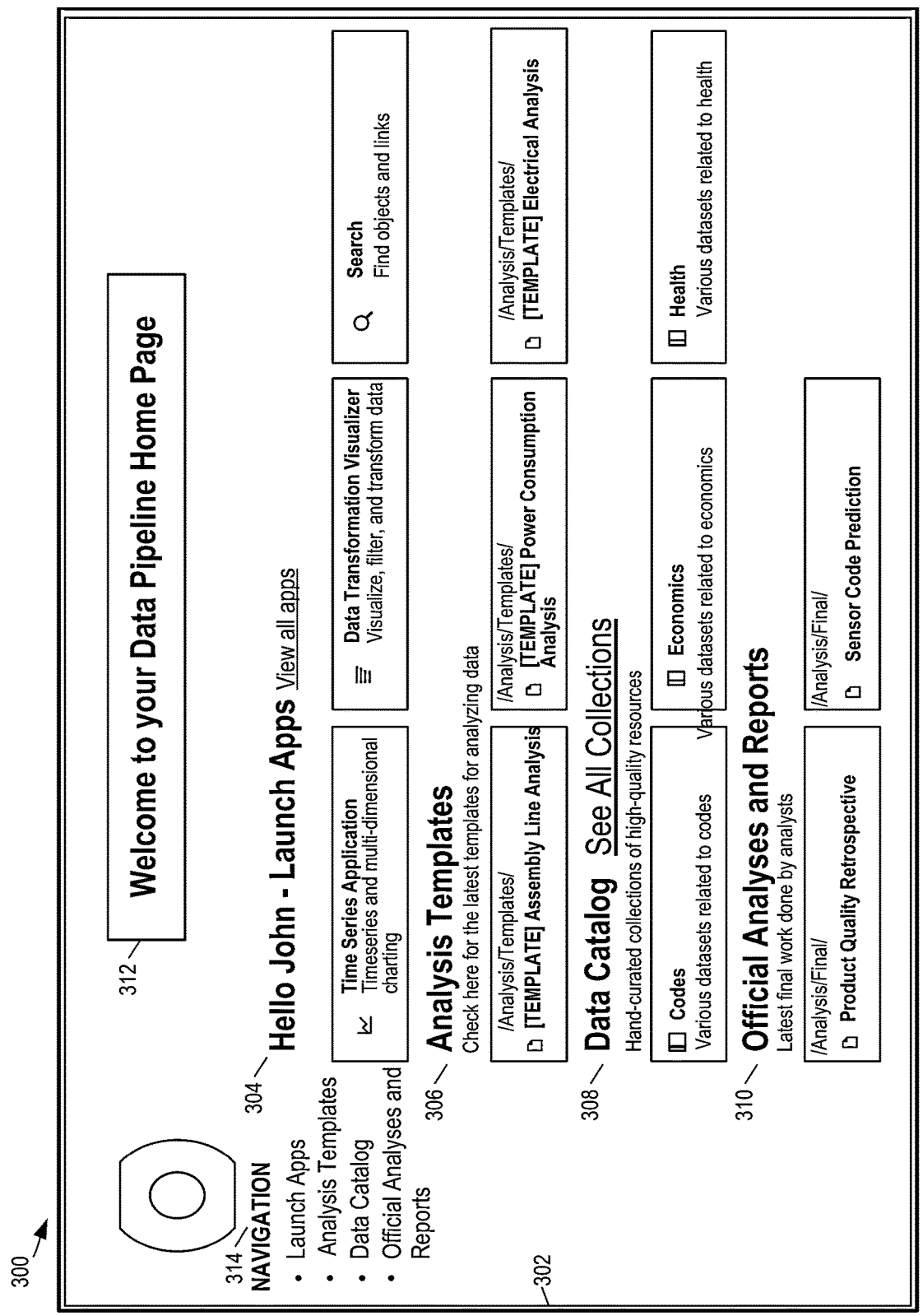
FIG. 3 illustrates an example analytical graphical user interface, according to some embodiments of the present disclosure.

FIG. 3 illustrates an example analytical graphical user interface, according to some embodiments of the present disclosure. The user interface 300 includes the page 302. The page 302 can include a first page section 304, a second page section 306, a third page section 308, and a fourth page section 310. The elements of the page 302, including the page sections 304, 306, 308, 310 can correspond to a page definition of a configuration container. The configuration containers 202, 204 of FIG. 2 may not correspond to the exact configuration of the page 302; however, the configuration container for the page 302 may be similar to some aspects of the configuration containers 202, 204 of FIG. 2. The configuration and selection of the elements of the page 302 may be customized for an analytical user, such as a user that is not necessarily familiar with coding, but rather is comfortable with spreadsheets applications and other point-and-click analytical tools. Accordingly, the page sections 304, 306, 308, 310 can include common tools, template analyses that the user can build off of, data catalogs, and other analyses and reports for the analytical user.

In some embodiments, the page sections 306, 308, 310 can be dynamic. The second page section 306 that presents analysis templates can be associated with a configuration section that causes the GUI system 100 to dynamically retrieve analysis templates. The analysis templates can be dynamically retrieved from a shared folder. Thus, if there are any updates to the shared folder, then a user can be presented with the updated contents of the shared folder when the user accesses the page 302. Likewise, the fourth page section 308 that presents analyses and reports can be associated with a configuration section that causes the GUI system 100 to dynamically retrieve corresponding analyses and reports. Similar to the analysis templates, the analyses and reports can be retrieved from a shared folder.

In some embodiments, the title section 312 and/or the navigation section 314 can be configured in the page definition of a configuration container. For example, a configuration section for a title and/or banner can include the text and/or references to images to be presented in the corresponding page sections 312, 314.

Figure 4B:
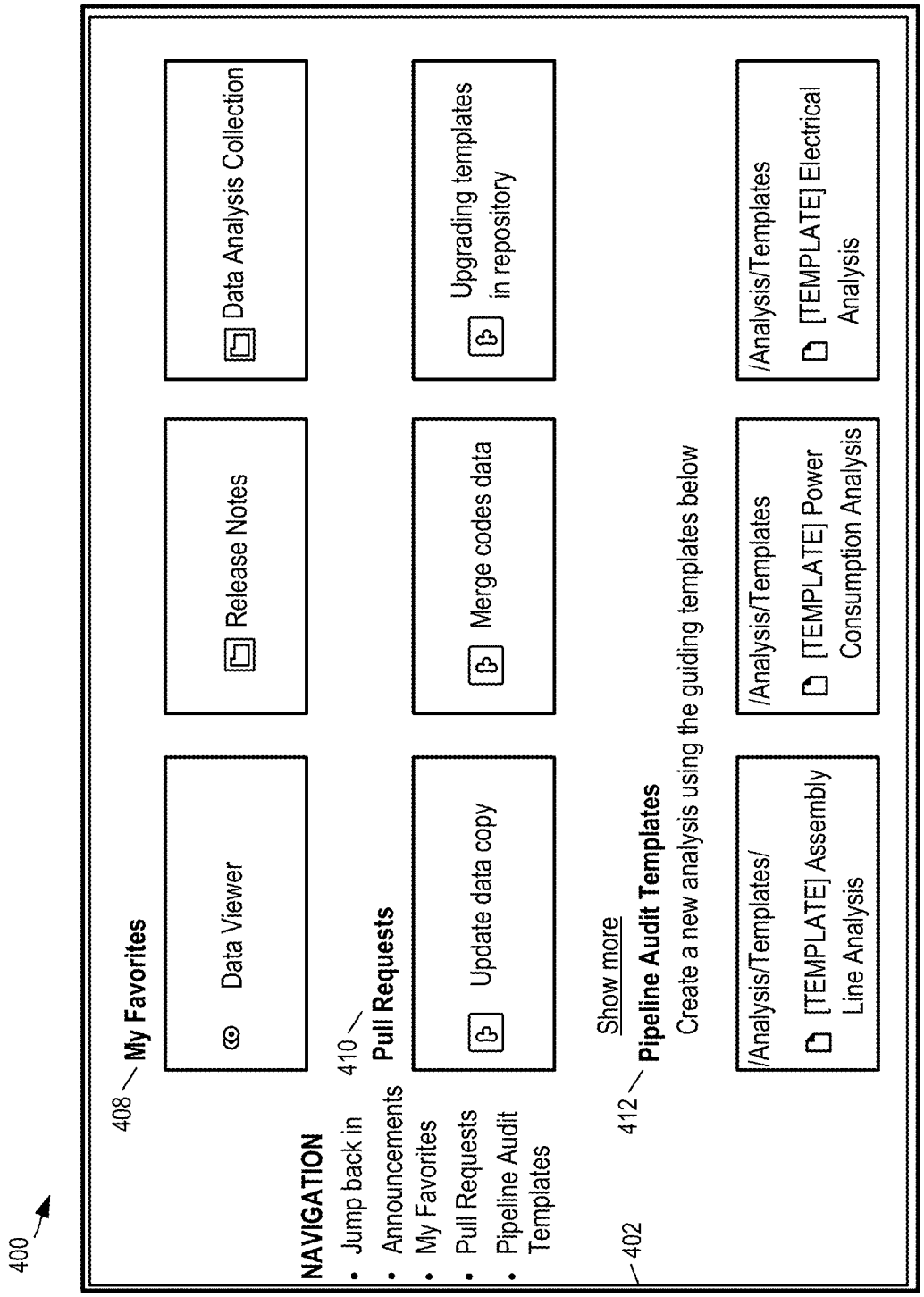

FIGS. 4A-4B illustrate an example technical graphical user interface, according to some embodiments of the present disclosure. In FIG. 4A, the user interface 400 includes the page 402. The page 402 of FIG. 4A can include a first page section 404 and a second page section 406. FIG. 4B depicts that the page 402 can include further sections. For example, a user can scroll down the page 402. The page 402 of FIG. 4B can include a third page section 408, a fourth page section 410, and a fifth page section 412. Similar to the elements of the page 302 of FIG. 3, the elements of the page 402, including the page sections 404, 406, 408, 410, 412 can correspond to a page definition of a configuration container. The configuration container for the page 402 may be similar to some aspects of the configuration containers 202, 204 of FIG. 2. The configuration and selection of the elements of the page 402 may be customized for a technical user, such as a user that is comfortable with writing code and/or queries, such as Java or Python code or SQL queries. In the context of a data pipeline, the technical user may be comfortable creating data transformations and/or other data manipulation techniques. Accordingly, the page sections 404, 406, 408, 410, 412 can include recently modified files, technical announcements, favorite documents, favorite technical applications, data pull requests, data audit templates, and/or other technical content or tools. Each of the page section 404 (recently modified files), the page section 406 (announcements), the page section 408 (favorites), the page section 410 (pull requests), and the page section 412 (data audit templates) can be dynamically retrieved content.

Figure 5:
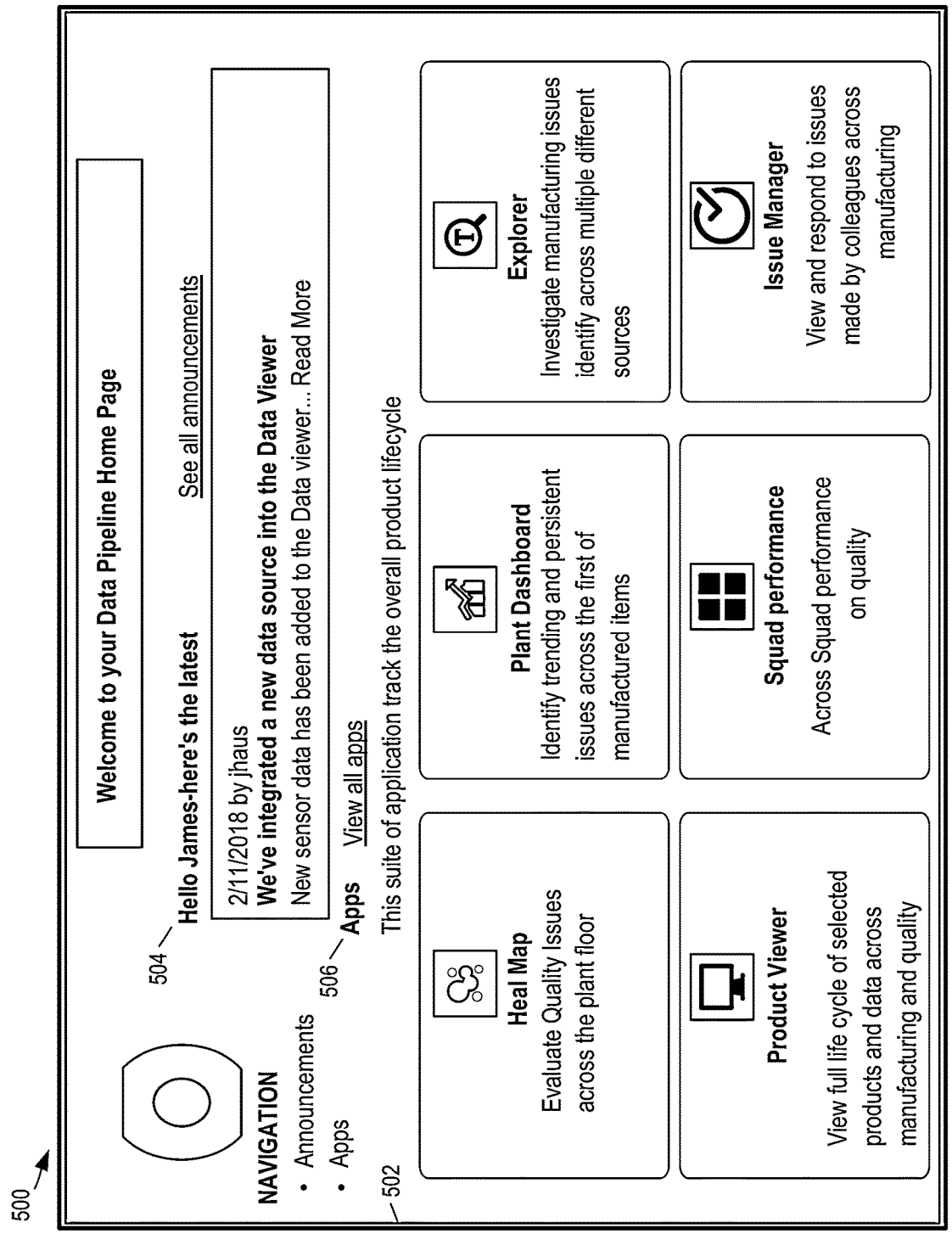
FIG. 5 illustrates an example non-technical graphical user interface, according to some embodiments of the present disclosure.

FIG. 5 illustrates an example non-technical graphical user interface, according to some embodiments of the present disclosure. In FIG. 5, the user interface 500 includes the page 502. The page 502 can include a first page section 504 and a second page section 506. Similar to the elements of the page 302 of FIG. 3, the elements of the page 502, including the page sections 504, 506 can correspond to a page definition of a configuration container. The configuration container for the page 502 may be similar to some aspects of the configuration containers 202, 204 of FIG. 2. The configuration and selection of the elements of the page 502 may be customized for a non-technical user, such as a user that prefers to see large links to applications and/or announcements that may be relevant to the user. Accordingly, the page sections 504, 506 can include announcements and/or large links or icons to commonly used applications.

In some embodiments, the GUI system 100 can include a visual editor for a page. For example, any of the user interfaces 300, 400, 500 of FIGS. 3, 4A-4B, 5 can include an edit mode where a user can add or remove page sections. Thus, a user and/or administrator can visually edit a page directly (instead of or in addition to editing a configuration container, such as a page's configuration file).

Example Page Generation

Figure 6:
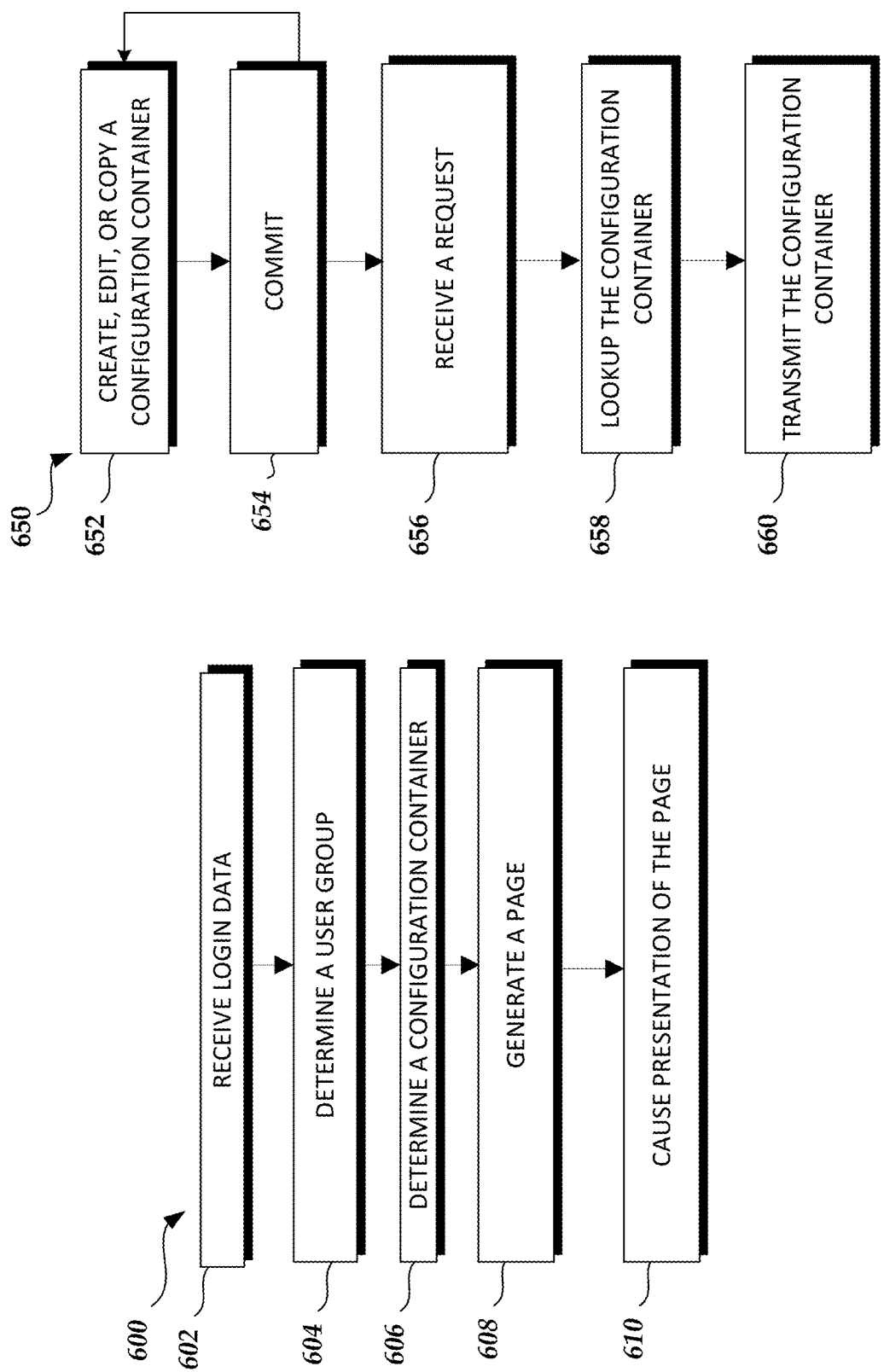
FIG. 6 are flowcharts illustrating example graphical user interface generation and versioning of configurations, according to some embodiments of the present disclosure.

FIG. 6 are flowcharts of example methods of generating user interfaces and/or versioning of configurations, according to some embodiments of the present disclosure.

Although the method 600 is described in conjunction with the systems of FIG. 1, any system configured to perform the method, in any order, is within the scope of this disclosure. The method 600 may be performed by the various components of the GUI system 100 of FIG. 1 as discussed herein, including the configuration service 104, the user interface generator 106, and/or the retrieval service 108. Depending on the embodiment, the method 600 may include fewer or additional blocks and/or the blocks may be performed in an order different than is illustrated. Blocks of the method 600 may be similar to blocks of any other method described herein. For example, the techniques and/or algorithms of a block of the method 600 may describe the techniques and/or algorithms that can be used at a block of any other method described herein. Additionally or alternatively, the method 600 may be combined with any other method described herein.

Beginning at block 602, login data can be received. Example login data includes user login data. The GUI system 100 can receive login data from the user computing device 102. The login data can be for a user profile. Before a customized page is provided to the user computing device 102, such as a home page (including any of the user interfaces described in further detail with respect to FIGS. 3, 4A, 4B, 5), a user may be prompted to enter login data in a login page. Once received, the login data can be authenticated. The GUI system 100 can retrieve metadata associated with the user based on the login data. Example metadata includes a user identifier and/or an access token that can be used during API calls. In other embodiments, the login data can include the access token.

The user computing device 102 can transmit a request for a page to the GUI system 100. In some embodiments, the request can include the login data. Additionally or alternatively, a user can login separately and at a later time the user computing device 102 can transmit a request for a page.

At block 604, a user group can be determined. For example, a user group can be determined from the login data. A user group can be associated with one or more users. The configuration service 104 can determine that the user is associated one or more user groups. The configuration data storage 112 can include a mapping of users (or user identifiers) to one or more user groups.

At block 606, a configuration container can be determined. An example configuration container includes a configuration file. In some embodiments, the configuration service 104 can retrieve a single configuration container from the configuration data storage 112 for all requests. In other embodiments, the configuration service 104 can select a configuration container from multiple configuration containers in the configuration data storage 112. For example, the GUI system 100 may support versioning of configuration containers and an appropriate versioned configuration container can be retrieved based on the page request and/or the login data. A page definition can be retrieved from the configuration container. The configuration service 104 can identify a page definition in a configuration container. Additional details regarding configuration containers are described in further detail with respect to FIG. 2.

In some embodiments, and as shown and described in FIG. 2, a configuration container can include multiple page definitions. The configuration service 104 can identify a page definition based on the login data and/or for a user group. As shown in FIG. 2, a page definition can include a key-value pair associating the page definition with a default user group or it can identify a specific user group. The configuration service 104 can select the first page definition that applies to the user and/or their user group. Additionally or alternatively, the configuration service 104 can apply other logic to select a page definition for a user. For example, a user profile may include demographic or a user's preferences that can be used by the configuration service 104 to employ logic to select an appropriate configuration. For example, the pages can be further customized by geographic region and provided to users that are located within a respective geographic region.

At block 608, a page can be generated. For example, the page can be generated from the identified page definition. The user interface generator 106 can generate a page for the page definition for the corresponding user group. Accordingly, the generated page can be customized for the user and/or user group. As described above with respect to FIG. 2, a page definition can include multiple configuration sections. The user interface generator 106 can generate a page based on the configuration sections in the page definition. For example, for each configuration section in the page definition, the user interface generator 106 can generate a corresponding page section.

The user interface generator 106 can generate different page sections based on the particular configuration of each configuration sections. As described herein, dynamic content can be generated for a page section using API calls. For example, a configuration section can correspond to page sections such as favorited documents, recently modified files, contributions by team members, or recently created templates, to name a few. Accordingly, a corresponding API call can be used to retrieve such dynamic content including any of the types of content described herein. The retrieval service 108 can transmit a content request, such as in an API call. The content request can include login data and/or an access token. In response to the content request, the retrieval service 108 can receive content and/or content metadata, such as favorited documents, recently modified files, contributions by team members, or recently created templates, etc. The user interface generator 106 can include logic for generating a page and/or a page section based on the content and/or content metadata, such as logic that can output markup language (such as HTML) for the page and/or the page section. The user interface generator 106 can include template logic to generate dynamic content for the customized page, such as an HTML template or other markup language template that is parameterized to output markup based on input data corresponding to the dynamically retrieved data. Example generated content can include an application link, an announcement, a folder, a data catalog, a data request, a data build, a data issue, a file, an image, a report, a document, and/or a representation of any of the foregoing.

In some embodiments, the configuration sections associated with dynamic content and APIs can use a plugin (a discrete group of software functions) framework. For each dynamic configuration section type, such as favorite documents or a folder section, there can be a particular plugin for each configuration section type. Thus, each plugin can include the appropriate API calls to communicate with other services to, for example, retrieve favorited documents for a user, retrieve recent documents, or retrieve documents from a particular folder. Moreover, each plugin can include the logic to render the resources retrieved from the corresponding API call. In some embodiments, the API calls can return one or more resource identifiers and the resource identifiers can be rendered as a resource representation. Metadata for a resource and its corresponding resource representation can be determined from a resource plugin, which is described in further detail below.

The user interface generator 106 can generate more static type content based on the configuration section. For example, the configuration section can include a resource identifier. Thus, the configuration section can refer to a resource, such as a document, an image, a data analysis, a time series, etc. The configuration section may also include text values for a title or other content to be included in a page section. Accordingly, the retrieval service 108 can retrieve a resource and/or resource metadata. In particular, the retrieval service 108 can retrieve a resource and/or resource metadata for the resource identifier. Thus, a page can be generated that includes the resource, such as a document, an image, a data analysis, a time series, etc. The user interface generator 106 can include logic for generating a page section based on the resource and/or resource metadata, again, such as logic that can output markup content (such as HTML) for the page and/or the page section. For example, a markup element can be generated from the resource metadata, such as one or more markup elements that can represent a document, an image, a data analysis, a time series, etc. The user interface generator 106 can include template logic to generate static type content for the customized page, such as an HTML template or other markup language template that is parameterized to output markup based on input data corresponding to the static type data, such as the resource metadata.

In some embodiments, the configuration sections can also use a resource plugin. The resource plugin can be responsible for taking a resource identifier as an input and retrieving a corresponding resource or the resources metadata, such as by using an API call and/or retrieving it from the resource data storage 132. Other optional input to retrieve a resource can include a resource version and/or login data such as an access token. The resource metadata can include a resource type, such as a file or data type, a resource name, a resource version. The resource plugin can use login data, such as an access token, in an API call to allow the service on the other side of the API call to determine whether the user has permissions to view or received the requested resource. Additional details regarding permissions and access control lists are described in further detail with respect to FIGS. 7 and 8. In some embodiments, the resource plugin can also be configured to render or generate the instructions that correspond to the representation of the resource in a page.

At block 610, the page can be presented. For example, the GUI system 100 can transmit the generated page to the user computing device 102, which causes presentation of the page. Example pages include any of the user interfaces shown in FIGS. 3, 4A, 4B, and 5. Accordingly, a customized page is presented to a user based on the user's group. The page can be specifically tailored to the particular user's needs is a diverse group of users, each with their own respective content and/or data needs with respect to a page such as a home page.

The other example flowchart of FIG. 6 is a method 650 of versioning configurations, according to some embodiments of the present disclosure. Advantages of being able to version configurations includes enabling rapid development of new user interfaces without affecting stable versions of existing user interfaces. Although the method 650 is described in conjunction with the systems of FIG. 1, any system configured to perform the method, in any order, is within the scope of this disclosure. The method 650 may be performed by the various components of the GUI system 100 of FIG. 1 as discussed herein, including the configuration service 104 and/or the user interface generator 106. Depending on the embodiment, the method 650 may include fewer or additional blocks and/or the blocks may be performed in an order different than is illustrated. Blocks of the method 650 may be similar to blocks of any other method described herein. For example, the blocks 656, 658, 660 of the method 650 can be performed or be similar to the block 606 to determine a configuration container. Additionally or alternatively, the method 650 may be combined with any other method described herein.

Beginning at block 652, a configuration container can be created, edited, and/or copied. For example, the configuration containers of FIG. 2 can be edited in a development environment such as an environment that includes a text editor. The GUI system 100 can include a configuration editor that can enable an administrator or user to edit a configuration container. The GUI system 100 can further support versioning. A version of the configuration container can be stored with a version identifier. In some embodiments, the GUI system 100 enables an administrator or user to make a copy of a configuration container, which can include branching an existing version of a configuration container.

At block 654, a version of the configuration container can be committed. For example, the configuration container from the previous block 652, which can include modifications, can be stored in the configuration data storage 112 with a particular version identifier. That version of the configuration container can then be accessible from the configuration data storage 112 by the particular version identifier. In some embodiments, multiple commits and multiple versions of a configuration container can be stored. Thus, the history of a configuration container may be available from the configuration data storage 112. For example, blocks 652 and 654 for making changings and storing commits, respectively, can process in a loop as shown in the versioning method 650.

At block 656, a request can be received. The request can be for a user group page. The request can include a version identifier, which can be used by the GUI system 100 to identify the corresponding version of a configuration container. In some embodiments, if the request does not include a version identifier, the GUI system 100 can use a default version or master version of a configuration container. Thus, the GUI system 100 can determine that a particular version of a configuration container is a default version for a request, such as a request that does not include a version identifier. At block 658, the configuration container can be retrieved. In particular, the GUI system 100, such as the configuration service 104, can look up the configuration container by the version identifier. At block 660, the configuration container can be transmitted. In particular, the configuration service 104 can transmit the configuration container to the user interface generator 106 to generate a user interface, such as a page, from the configuration container.

Blocks 656, 658, 660 can provide a rapid development experience by which a user or administrator can make changes or create new user interfaces with minimal configuration. A first configuration container can be stored as a first version configuration container that can be identified by a first version identifier. The GUI system 100 can receive a modification to the first configuration container. The modification can be stored as a second version configuration container that can be identified by a second version identifier. Since the history of the configuration container can be stored by the GUI system 100, a first request can be received that includes the first version identifier and a second request can be received that includes the second version identifier. In response to receiving the first request, the GUI system 100 can present a page associated with the first version configuration container as identified by the first version identifier. Likewise, in response to receiving the second request, causing presentation of a modified user group page associated with the second version configuration file identifiable by the second version identifier. Thus, an administrator or user can both edit and view the end results (a user interface or page) based on their modifications to a configuration container. As described herein, these changes can be viewed and deployed without or before recompiling or rebuilding the application that provides the user interfaces, such as a web application. A user can view a first, second, third, etc., version of a page in any order using the versioning system. For example, a uniform resource locator (URL) can include the version of the page and the corresponding configuration container can be retrieved. Thus, an administrator can use a web browser to view multiple versions or the version history of a page by entering different version identifiers in the URL as a parameter.

In some embodiments, the GUI system 100 can present a series of questions to generate a page configuration for user. For example, the GUI system 100 can provide a quiz as part of an onboarding experience for new users. The quiz can include questions such as the user's geographic region, position at an organization, interests, and common applications. Accordingly, the GUI system 100 can include predefined logic to generate a page configuration based on the answers to the questions. For example, answers that indicate a user is more technically focused can result in a page configuration that includes more technical tools and data. Conversely, answers that indicate a user is more non-technical can result in a page configuration that includes more non-technical links and less-technical reports and data.

In some embodiments, the GUI system 100 can use configuration sections that can dynamically retrieve and present parameterized content in the generated user interfaces. It may be advantageous to share content users based on some parameter, such as a geographic region, a team or group affiliation, a content preference, and/or a subject matter type. For example, a resource may be at least partially parameterized, for example, a portion of a report may be parameterized. An author may generate a report that has a fill-in-the-blank for a type of subject matter or a geographic region. A resource, such as a report, or a section of the resource can be associated or tagged with the specific parameter. Thus, users that are interested in or associated with that subject matter type or geographic region can dynamically receive the report or a section of the report that has been parameterized. Accordingly, there can be configuration sections directed towards this type of parameterized content. For example, the configuration section can generically be associated with a parameter, such as any geographic region or subject matter type generally, and when the corresponding page section is generated content can be retrieved for the user's geographic region or subject matter type. Additionally or alternatively, the configuration section can include a specific parameter, such as a specific geographic region (such as "North America"), a specific team affiliation (such as "Team A"), or a specific subject matter type (such as "Sensor Reports"). Thus, dynamic content that is associated or tagged with the specific parameter can be retrieved and presented on a customized page. In some embodiments, the parameterized content can be retrieved via API calls, such as by specifying the parameter as input to an API call and receiving output from the call that includes content associated with the parameter.

In a geographic region example, a page section can be generated from a configuration section directed towards a geographic region parameter. Generating the page section can include determining a geographic region from the user login data and identifying content with a tag for the geographic region. As described herein, identifying content with a specific tag or parameter can be based on an API call.

Example Data Pipeline Context

Figure 7:
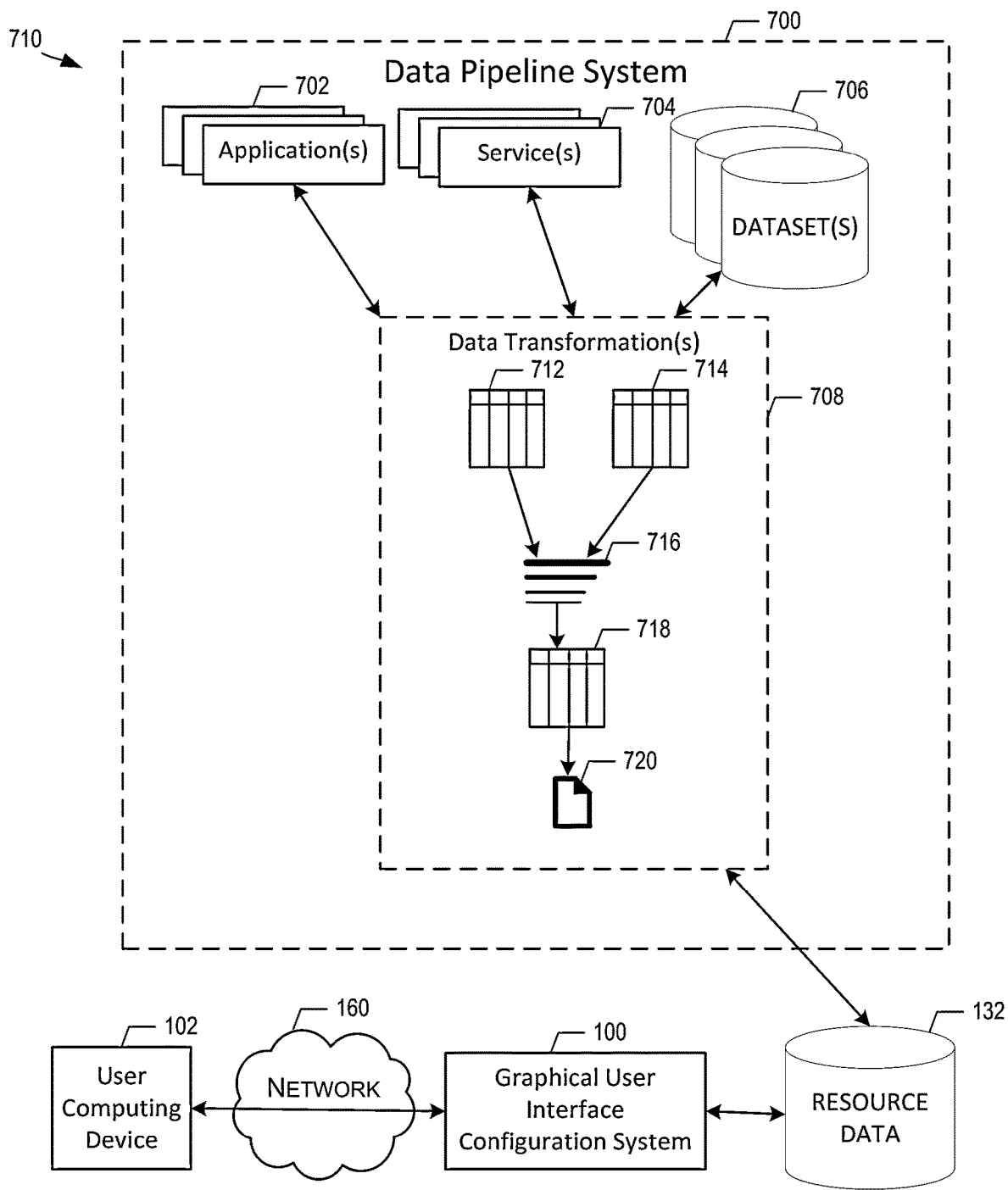
FIG. 7 is a block diagram illustrating an example graphical user interface configuration system in a data pipeline context, according to some embodiments of the present disclosure.

FIG. 7 illustrates a GUI system 100 in a data pipeline context, according to some embodiments of the present disclosure. In the embodiment of FIG. 7, the computing environment 710 can be similar to the computing environment 110 of FIG. 1. For example, the computing environment 710 can include a network 160, a GUI system 100, a user computing device 102, and a resource data storage 132, each of which may be similar to respective devices and systems in the computing environment 110 of FIG. 1. However, the computing environment 710 can also include a data pipeline system 700.

The example data pipeline system 700 includes one or more applications 702, one or more services 704, one or more initial datasets 706, and a data transformation process 708 (also referred to herein as a build process). The data pipeline system 700 can transform data and record the data transformations. The one or more applications 702 can include applications that enable users to view datasets, interact with datasets, filter data sets, and/or configure dataset transformation processes or builds. The one or more services 704 can include services that can trigger the data transformation builds and API services for receiving and transmitting data. The one or more initial datasets 706 can be automatically retrieved from external sources and/or can be manually imported by a user. The one or more initial datasets 706 can be in many different formats such as a tabular data format (SQL, delimited, or a spreadsheet data format), a data log format (such as network logs), or time series data (such as sensor data).

The data pipeline system 700, via the one or more services 704, can apply the data transformation process 708. An example data transformation process 708 is shown. The data pipeline system 700 can receive one or more initial datasets 712, 714. The data pipeline system 700 can apply a transformation to the dataset(s). For example, the data pipeline system 700 can apply a first transformation 716 to the initial datasets 712, 714, which can include joining the initial datasets 712, 714 (such as or similar to a SQL JOIN), and/or a filtering of the initial datasets 712, 714. The output of the first transformation 716 can include a modified dataset 718. A second transformation 720 of the modified dataset 718 can result in an output dataset 720, such as a report. Each of the steps in the example data transformation process 708 can be recorded by the data pipeline system 700 and made available as a resource to the GUI system 100. For example, a resource can include a dataset and/or a dataset item, a transformation, or any other step in a data transformation process. As mentioned above, the data transformation process or build 708 can be triggered by the data pipeline system 700, where example triggers can include nightly build processes, detected events, or manual triggers by a user. Additional aspects of data transformations and the data pipeline system 700 are described in further detail below.

The techniques for recording and transforming data in the data pipeline system 700 may include maintaining an immutable history of data recording and transformation actions such as uploading a new dataset version to the system 700 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "datasets." More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset. As a simple example, a version identifier of '1' may be recorded in the catalog for an initial dataset item of a dataset. If data is later added to the dataset, a version identifier of '2' may be recorded in the catalog for a second dataset item that conceptually includes the data of the initial dataset item and the added data. In this example, dataset item '2' may represent the current dataset version and is ordered after dataset item '1'.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (i.e., pre-existing versions of the dataset) are preserved when a new dataset item is added to the dataset (i.e., when a new version of the dataset is created). Note that supporting immutable datasets is not inconsistent with pruning or deleting dataset items corresponding to old dataset versions. For example, old dataset items may be deleted from the system to conserve data storage space.

A version of dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (i.e., a new dataset item of the dataset) without deleting, removing, or modifying pre-existing dataset items (i.e., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In a preferred embodiment, the dataset version corresponds an identifier assigned to the transaction that created the dataset version. The dataset item may be associated in the catalog with the set of files that contain the data of the dataset item. In a preferred embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (i.e., different dataset items) of the datasets. In association with information identifying a particular version (i.e., a particular dataset item) of a dataset, there may be information identifying one or more files that contain the data of the particular dataset version (i.e., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the data pipeline system 700 multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance tracking extends beyond transaction level granularity to column level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and Transaction 2." Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column-level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset(s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The data pipeline system 700 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The data pipeline system 700 may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the data pipeline system 700 to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

Example Access Control List

Figure 8:
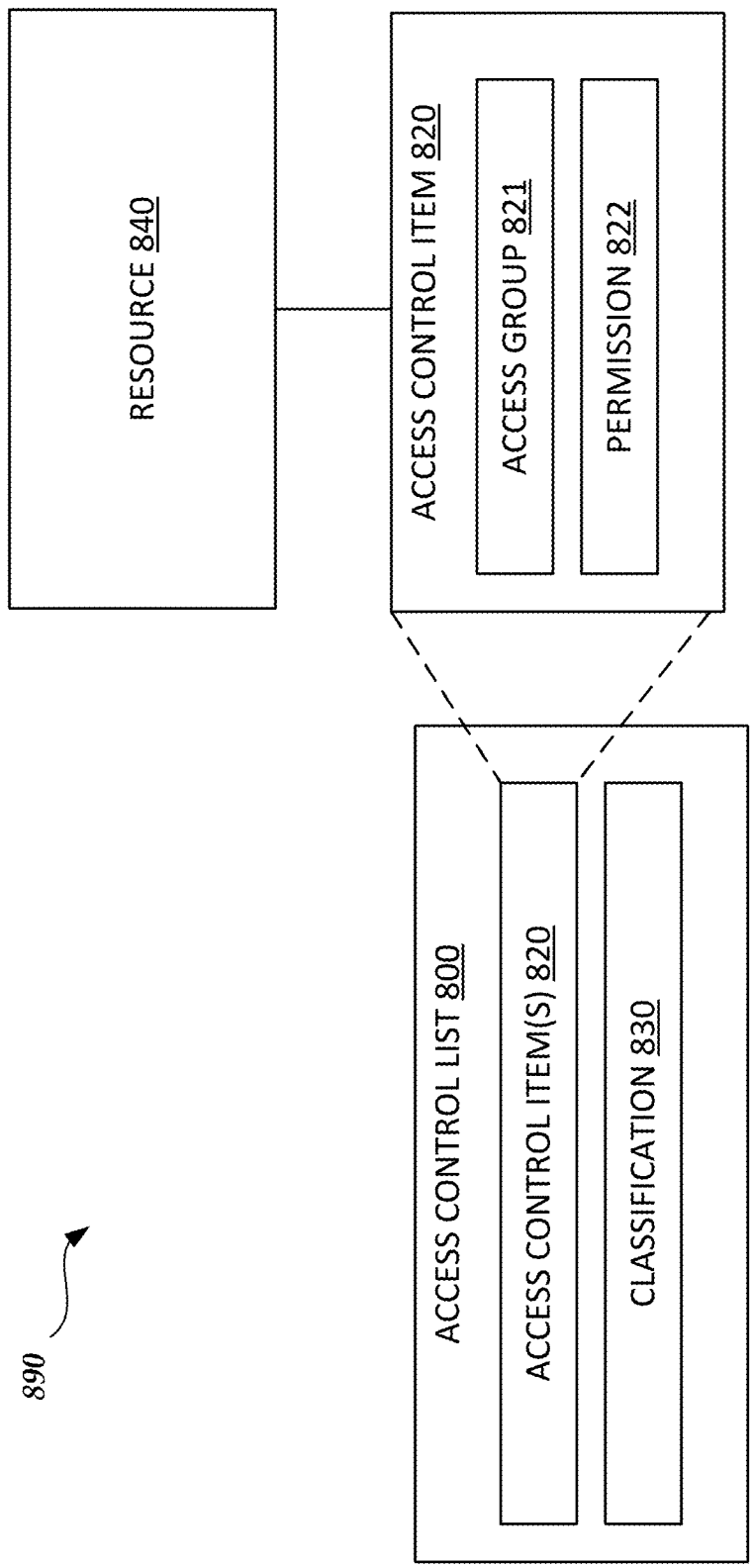
FIG. 8 is a block diagram illustrating an example access control list for a resource, according to some embodiments of the present disclosure.

FIG. 8 is a block diagram illustrating an example access control list for a resource, according to some embodiments of the present disclosure. In some embodiments, the GUI system 100 communicates with APIs and/or other systems that use access control lists to determine whether a user is permitted to view a resource, which can include documents, files, data analysis, time series, or any data or object in a system such as the data pipeline system 700 of FIG. 7. Access control environment 890 includes a resource 840 and an access control list 800. In some embodiments, the access control list 800 is stored in a data store of another system different from the GUI system 100. The access control list 800 includes one or more access control items 820 and zero or more classifications 830. The access control item is associated with a resource 840. Thus, the access control list 800 can provide a level of granularity to specify sharing rules and/or permissions on a per-resource basis. For example, when the GUI system 100 makes an API call or otherwise retrieves a resource, an access token or other credentials can be checked against the access control list 800 to determine whether the corresponding user has permission to access the resource.

The access control item 830 includes an access group 821 and a permission 822. The access group 821 identifies a set of users and/or teams. The permission 822 identifies an operation that a user in the set can perform on the resource 840 (such as a read operation). Additionally or alternatively, the permission 822 can further identify an operation the user in the set can perform on access control list 800. Non-limiting examples of the permission 822 include read, write, owner, create, delete, read only, and/or some combination thereof.

In some embodiments, if the access control list 800 has a classification 830, then a user must be authorized for the classification 830. Thus, the classification 830 may override the permission 822 granted to the team, entity, and/or user. For example, one possible set of classification markings as part of classification 830 include "Top Secret," "Secret," "Confidential," "Restricted," "For Official Use Only," among others, while another example classification scheme may use the markings: "Public" and "Restricted," among others. For example, the permissions of an access control list may indicate that a particular resource should not be shared with particular users.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

The software instructions and/or other executable code described herein may be read from a computer readable storage medium (or mediums). The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a segment or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
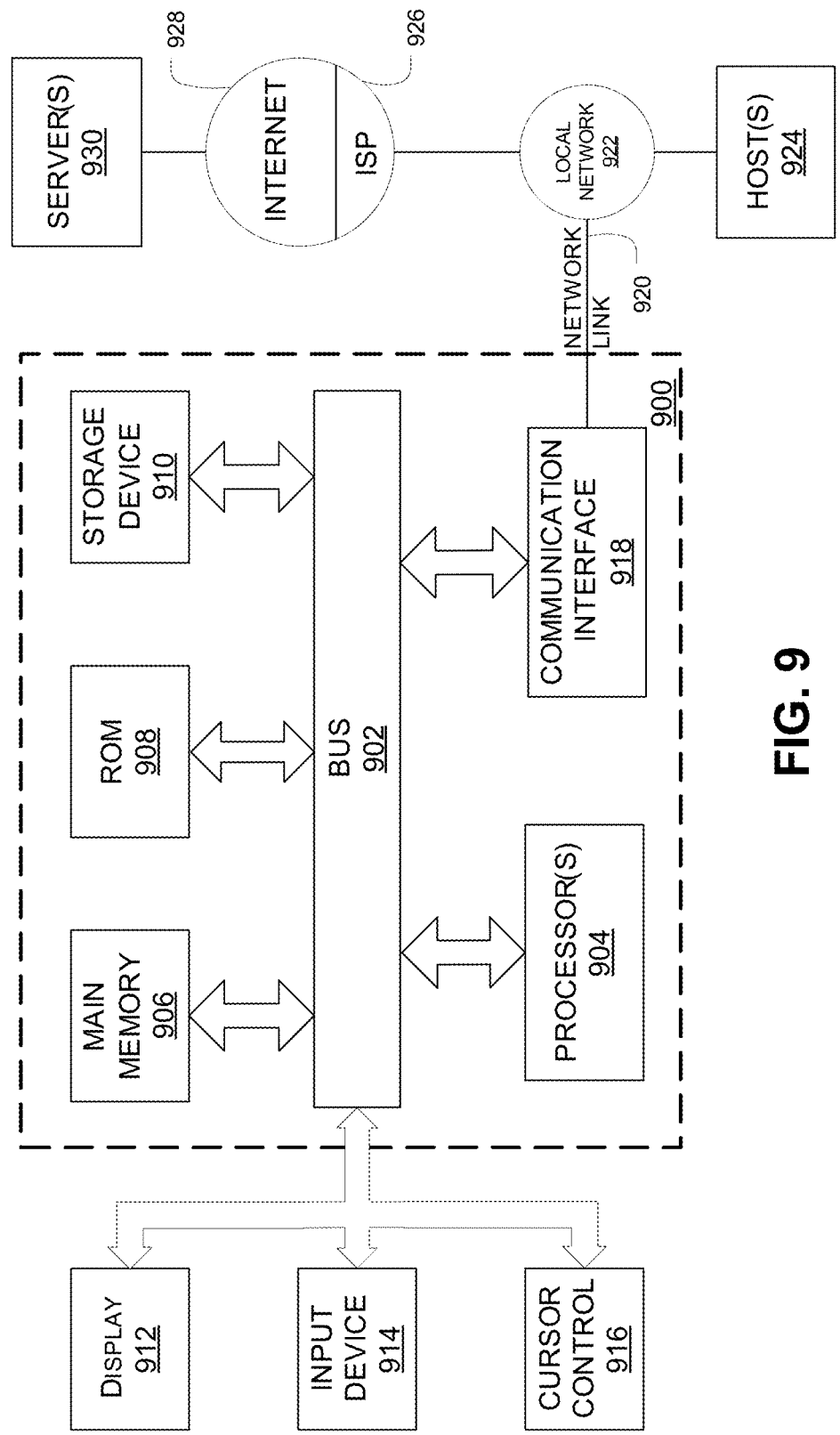
FIG. 9 is a block diagram illustrating an example graphical user interface configuration system with which various methods and systems discussed herein may be implemented.

For example, FIG. 9 is a block diagram that illustrates a computer system 900 upon which various embodiments may be implemented. The computer system 900 includes a bus 902 or other communication mechanism for communicating information, and a hardware processor, or multiple processors, 904 coupled with bus 902 for processing information. The hardware processor(s) 904 may be, for example, one or more general purpose microprocessors. The GUI system 100, any of the other computing devices, modules, services, and/or user computing devices discussed herein may have some or all of the same or similar components of the computer system 900.

The computer system 900 also includes a main memory 906, such as a random access memory (RAM), cache and/or other dynamic storage devices, coupled to the bus 902 for storing information and instructions to be executed by a processor 904. The main memory 906 also may be used for storing temporary variables or other intermediate information during execution of instructions to be executed by a processor 904. Such instructions, when stored in storage media accessible to the processor 904, render the computer system 900 into a special-purpose machine that is customized to perform the operations specified in the instructions. Such instructions, as executed by hardware processors, may implement the methods and systems described herein for generating and/or rapidly deploying user interfaces based on configuration files.

The computer system 900 further includes a read only memory (ROM) 908 or other static storage device coupled to bus 902 for storing static information and instructions for processor(s) 904. A storage device 910, such as a magnetic disk, optical disk, or flash drive, etc., is provided and coupled to bus 902 for storing information and instructions. The configuration service 104, the user interface generator 106, and/or the retrieval service 108 of FIG. 1 may be stored on the main memory 906 and/or the storage device 910.

The computer system 900 may be coupled via the bus 902 to a display 912, such as a cathode ray tube (CRT) or LCD display (or touch screen), for displaying information to a computer user. An input device 914, including alphanumeric and other keys, is coupled to bus 902 for communicating information and command selections to the processor 904. Another type of input device 914 is a touch screen. Another type of user input device is the cursor control 916, such as a mouse, a trackball, or cursor direction keys for communicating direction information and command selections to the processor 904 and for controlling cursor movement on the display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

According to one embodiment, the techniques herein are performed by computer system 900 in response to the processor(s) 904 executing one or more sequences of one or more computer readable program instructions contained in the main memory 906. Such instructions may be read into the main memory 906 from another storage medium, such as the storage device 910. Execution of the sequences of instructions contained in the main memory 906 causes the processor(s) 904 to perform the process steps described herein. In alternative embodiments, hard-wired circuitry may be used in place of or in combination with software instructions.

Various forms of computer readable storage media may be involved in carrying one or more sequences of one or more computer readable program instructions to the processor 904 for execution. For example, the instructions may initially be carried on a magnetic disk or solid state drive of a remote computer. The remote computer can load the instructions into its dynamic memory and send the instructions over a computer network. The computer system 900 can receive the data and appropriate circuitry can place the data on the bus 902. The bus 902 carries the data to the main memory 906, from which the processor 904 retrieves and executes the instructions. The instructions received by the main memory 906 may optionally be stored on the storage device 910 either before or after execution by the processor 904.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to the bus 902. The communication interface 918 provides a two-way data communication coupling to a network link 920 that is connected to a local network 922. For example, the communication interface 918 may be an integrated services digital network (ISDN) card, cable modem, satellite modem, or a modem to provide a data communication connection to a corresponding type of telephone line. As another example, the communication interface 918 may be a local area network (LAN) card to provide a data communication connection to a compatible LAN (or WAN component to communicated with a WAN). Wireless links may also be implemented. In any such implementation, the communication interface 918 sends and receives electrical, electromagnetic or optical signals that carry digital data streams representing various types of information.

The network link 920 typically provides data communication through one or more networks to other data devices. For example, the network link 920 may provide a connection through the local network 922 to a host computer 924 or to data equipment operated by an Internet Service Provider (ISP) 926. The ISP 926 in turn provides data communication services through the world wide packet data communication network now commonly referred to as the "Internet" 928. The local network 922 and Internet 928 both use electrical, electromagnetic or optical signals that carry digital data streams. The signals through the various networks and the signals on the network link 920 and through communication interface 918, which carry the digital data to and from the computer system 900, are example forms of transmission media.

A network, such as the network 160 of FIG. 1, may comprise, but is not limited to, one or more local area networks, wide area network, wireless local area network, wireless wide area network, the Internet, or any combination thereof.

The computer system 900 can send messages and receive data, including program code, through the network(s), network link 920 and communication interface 918. In the Internet example, a server 930 might transmit a requested code for an application program through the Internet 928, the ISP 926, the local network 922 and the communication interface 918.

The received code may be executed by the processor(s) 904 as it is received, and/or stored in the storage device 910, or other non-volatile storage for later execution.

In some embodiments, the GUI system 100 and/or the computer system 900 may operate in a distributed computing environment including several computer systems that are interconnected using one or more computer networks. The GUI system 100 and/or the computer system 900 could also operate within a computing environment having a fewer or greater number of devices than are illustrated in FIG. 1 and/or FIG. 9. Thus, the depiction of GUI system 100 and/or the computer system 900 in FIG. 1 and/or FIG. 9 should be taken as illustrative and not limiting to the present disclosure. For example, the GUI system 100 and/or the computer system 900 could implement various Web services components and/or peer-to-peer network configurations to implement at least a portion of the processes described herein. For example, multiple servers and/or processes may process and/or analyze items and/or present a user interface in a distributed manner, as described herein.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

It will be appreciated that while the present disclosure typically discusses user interfaces or pages in the context of a data pipeline system as examples, the systems and methods described herein regarding generating user interfaces and other aspects may be agnostic to the backend data systems. For example, the techniques for generating user interfaces from configurations described herein may be used at any organization where the user base is diverse and has different needs for user interfaces.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others.

The scope of certain inventions disclosed herein is indicated by the appended claims rather than by the foregoing description. All changes which come within the meaning and range of equivalency of the claims are to be embraced within their scope.

What is claimed is:

1. A method for generating a page for a user group, the method comprising:
receiving user login data;
determining a user group from the user login data;
retrieving a configuration file for the user group;
determining, from the configuration file, a page definition comprising a first configuration section and a second configuration section,
the first configuration section comprising a first text value that indicates a first configuration section type associated with a first application programming interface (API) call configured to request content from a first network location, wherein the configuration file is in a first file format, and
the second configuration section comprising a second text value that indicates a second configuration section type and a plurality of resource identifiers,
wherein the first file format is at least one of: a YAML Ain't Markup Language (YAML) format, an object notation format, or an XML format;
generating, from the first configuration section, a first page section, wherein generating the first page section further comprises:
identifying the first API call corresponding to the first configuration section type;
executing the API call comprising the user login data; and
in response to executing the API call, receiving first content, wherein the first page section comprises the first content;
determining that the second configuration section type indicates an association with a resource list, and in response thereto, generating the second page section by:
for each resource identifier in the plurality of resource identifiers in the second configuration section type, accessing content using the resource identifier and including at least some of the accessed content in the second page section; and
generating a user group page comprising the first page section and the second page section, wherein the first page section is in a first markup format different from the first file format and the second page section is in a second markup format different from the first file format, wherein the user group page is configured to cause concurrent display of the first page section as adjacent to the second page section in the user group page, wherein the first page section is configured to cause display of the first content, and wherein the second page section is configured to cause display of each accessed content in the second page section,
wherein the method is performed by one or more computer hardware processors.

2. The method of claim 1, wherein generating the second page section further comprises:
for each resource identifier of the resource list:
retrieving resource metadata for the resource identifier; and
generating a markup element from the resource metadata, the second content comprising the markup element.

3. The method of claim 1, further comprising:
storing the configuration file as a first version configuration file identifiable by a first version identifier;
receiving a modification to the configuration file;
storing the modification as a second version configuration file identifiable by a second version identifier;
receiving a first request comprising the first version identifier;
in response to receiving the first request, causing presentation of the user group page associated with the first version configuration file identifiable by the first version identifier;
receiving a second request comprising the second version identifier; and
in response to receiving the second request, causing presentation of a modified user group page associated with the second version configuration file identifiable by the second version identifier.

4. The method of claim 1, wherein the first content comprises at least one of: a recent resource, contents of a folder, a favorited resource, or a recently modified resource.

5. The method of claim 1, wherein the second content comprises a resource from a data pipeline system, the method further comprising:
receiving a dataset; and
generating the resource, wherein generating the resource comprises:
applying a transformation to the dataset, wherein output of the transformation comprises a modified dataset, the resource comprising the modified dataset.

6. The method of claim 1, wherein the page definition further comprises a third configuration section, the method further comprising:
generating, from the third configuration section, a third page section, wherein generating the third page section further comprises:
determining a geographic region from the user login data; and
identifying third content with a tag for the geographic region, wherein the third page section comprises the third content and the user group page comprises the third page section.

7. A system comprising:
a non-transitory computer storage medium configured to at least store computer-executable instructions; and
one or more computer hardware processors in communication with the non-transitory computer storage medium, the one or more computer hardware processors configured to execute the computer-executable instructions to at least:
receive user login data for a user profile;
determine a user group from the user login data;
retrieve a configuration file for the user group;
determine, from the configuration file, a page definition comprising a first configuration section and a second configuration section,
the first configuration section comprising a first text value that indicates a first configuration section type associated with a first application programming interface (API) call configured to request content from a first network location, wherein the configuration file is in a first file format, and
the second configuration section comprising a second text value that indicates a second configuration section type and a plurality of resource identifiers, wherein the first file format is at least one of: a YAML Ain't Markup Language (YAML) format, an object notation format, or an XML format;

generate, from the first configuration section, a first page section, wherein generating the first page section further comprises:

identifying the first API call corresponding to the first configuration section type;

executing the API call for the user profile; and in response to executing the API call, receiving first content, wherein the first page section comprises the first content;

determine that the second configuration section type indicates an association with a resource list, and in response thereto, generate, the second page section by:

for each resource identifier in the plurality of resource identifiers in the second configuration section type, accessing content using the resource identifier and including at least some of the accessed content in the second page section; and generate a user group page comprising the first page section and the second page section, wherein the first page section is in a first markup format different from the first file format and the second page section is in a second markup format different from the first file format, wherein the user group page is configured to cause concurrent display of the first page section as adjacent to the second page section in the user group page, wherein the first page section is configured to cause display of the first content, and wherein the second page section is configured to cause display of each accessed content in the second page section.

8. The system of claim 7, wherein generating the second page section further comprises:

for each resource identifier in the resource list:

retrieving resource metadata for the resource identifier; and generating a markup element from the resource metadata, the second content comprising the markup element.

9. The system of claim 7, wherein the one or more computer hardware processors are further configured to:

store the configuration file as a first version configuration file identifiable by a first version identifier;

receive a modification to the configuration file;

store the modification as a second version configuration file identifiable by a second version identifier;

receive a first request;

in response to receiving the first request, cause presentation of the user group page associated with the first version configuration file identifiable by the first version identifier;

receive a second request comprising the second version identifier; and in response to receiving the second request, cause presentation of a modified user group page associated with the second version configuration file identifiable by the second version identifier.

10. The system of claim 9, wherein the one or more computer hardware processors are further configured to:

in response to receiving the first request, determine that the first version configuration file identifiable by a first version identifier is a default version for the first request.

11. The system of claim 7, wherein the second content comprises a resource from a data pipeline system, and wherein the one or more computer hardware processors are further configured to:

receive a dataset; and generate the resource, wherein generating the resource comprises:

applying a transformation to the dataset, wherein output of the transformation comprises a modified dataset, the resource comprising the modified dataset.

12. The system of claim 7, wherein the page definition further comprises a third configuration section, and wherein the one or more computer hardware processors are further configured to:

generate, from the third configuration section, a third page section, wherein generating the third page section further comprises:

determining a geographic region from the user login data; and identifying third content with a tag for the geographic region, wherein the third page section comprises the third content and the user group page comprises the third page section.

13. The system of claim 7, wherein at least one of the first content or the second content comprises a folder or a file.

14. The system of claim 7, wherein the page definition further comprises a third configuration section, the third configuration section comprising a third text value that indicates a third configuration section type, generate, from the third configuration section, a third page section, wherein generating the third page section further comprises:

generating third content based on the third configuration section type, wherein the third content is different than first content based on the first section type being different from the first configuration section type, and wherein the third page section comprises the third content and the user group page comprises the third page section.

* * * * *